(12) United States Patent
Mori et al.

(10) Patent No.: US 7,867,655 B2
(45) Date of Patent: Jan. 11, 2011

(54) NICKEL METAL-HYDRIDE BATTERY

(75) Inventors: Hiroaki Mori, Kyoto (JP); Kouichi Sakamoto, Kyoto (JP); Toshinori Bandou, Kyoto (JP); Kazuya Okabe, Kyoto (JP)

(73) Assignee: GS Yuasa Corporation, Kyoto-Shi, Kyoto (JP)

( * ) Notice: Subject to any disclaimer, the term of this patent is extended or adjusted under 35 U.S.C. 154(b) by 223 days.

(21) Appl. No.: 11/988,205

(22) PCT Filed: Jun. 30, 2006

(86) PCT No.: PCT/JP2006/313517

§ 371 (c)(1),
(2), (4) Date: Jan. 3, 2008

(87) PCT Pub. No.: WO2007/004703

PCT Pub. Date: Jan. 11, 2007

(65) Prior Publication Data

US 2009/0130551 A1 May 21, 2009

(30) Foreign Application Priority Data

Jul. 4, 2005 (JP) .............................. 2005-195371

(51) Int. Cl.
*H01M 4/58* (2010.01)
(52) U.S. Cl. ................. 429/218.2; 429/218.1; 429/209
(58) Field of Classification Search ........................ None
See application file for complete search history.

(56) References Cited

U.S. PATENT DOCUMENTS

| | | | | |
|---|---|---|---|---|
| 5,912,089 A | * | 6/1999 | Kitano et al. | 429/53 |
| 6,013,390 A | * | 1/2000 | Kimiya et al. | 429/206 |
| 6,790,558 B2 | * | 9/2004 | Okada et al. | 429/218.2 |

FOREIGN PATENT DOCUMENTS

| | | | |
|---|---|---|---|
| JP | H09-007588 | | 1/1997 |
| JP | H11-102689 | | 4/1999 |
| JP | H11-162505 | | 6/1999 |
| JP | 11-323404 | * | 11/1999 |
| JP | 2004-247288 | | 9/2004 |

OTHER PUBLICATIONS

Machine translation of JP 11-323404.*

* cited by examiner

*Primary Examiner*—Patrick Ryan
*Assistant Examiner*—Cynthia Lee
(74) *Attorney, Agent, or Firm*—Manabu Kanesaka

(57) ABSTRACT

A sealed nickel metal-hydride battery shows a high output density and an excellent cycle performance particularly in a cold atmosphere. In a nickel metal-hydride battery having a nickel electrode and a hydrogen absorbing electrode respectively as positive electrode and negative electrode, the hydrogen absorbing electrode is formed by making an conductive support carry hydrogen absorbing alloy powder of rare earth elements and non-rare earth elements including nickel and the saturation mass susceptibility of the hydrogen absorbing alloy powder is 2 to 6 emu/g while the rate at which the hydrogen absorbing electrode carries hydrogen absorbing alloy powder per unit area is 0.06 to 0.15 g/cm².

15 Claims, 5 Drawing Sheets

NICKEL METAL-HYDRIDE BATTERY

TECHNICAL FIELD

The present invention relates to a nickel metal-hydride battery having a hydrogen absorbing electrode that contains hydrogen absorbing alloy powder as negative electrode. More particularly, the present invention relates to a nickel metal-hydride battery having an improved output power performance and an improved cycle performance.

BACKGROUND ART

Electric motor-driven equipment including mobile electronic equipment such as mobile computers and digital cameras are required to be downsized and lightweight and the market of electric motor-driven equipment has been rapidly growing in recent years. As a power supply of such electric motor-driven equipment, sealed nickel metal-hydride batteries provide energy per unit volume and unit weight higher than nickel cadmium storage batteries and lead storage batteries and are excellent in terms of resistance to over-charge and over-discharge so that they are popularly being used as environment-friendly clean power sources. Additionally, sealed nickel metal-hydride batteries are finding applications in the field of power sources of hybrid electric vehicles (HEVs), electric motor-driven tools and electric toys that have been driven heretofore by nickel cadmium batteries and require high output power performance and a long service life.

Nickel metal-hydride batteries to be applied to power sources of HEVs, electric motor-driven tools and electric toys having a heavy load are required to be improved in terms of output power performance particularly at a low temperature (e.g., 0° C.) at least without reducing the charge/discharge cycle performance. Nickel metal-hydride batteries desirably show an output density not less than 400 W/kg, preferably not less than 600 W/kg, at a low temperature (0° C.) for applications having a heavy load such as power sources of HEVs and electric motor-driven tools. Additionally, the nickel metal-hydride battery installed in a HEV at a position where the temperature of the ambient air can be raised desirably has a cycle life of not less than 400 cycles, preferably not less than 500 cycles, at a high temperature (e.g., 45° C.).

The output power performance of a nickel metal-hydride battery can vary mainly depending on the discharge ability of the hydrogen absorbing electrode thereof. Proposals for activating hydrogen absorbing alloy powder by immersing the hydrogen absorbing alloy powder in a weakly acidic aqueous solution or a hot alkaline aqueous solution have been made to date to improve the high-rate discharge ability of a hydrogen absorbing electrode. For example, methods of surface-treating hydrogen absorbing alloy powder by means of a weakly acidic aqueous solution with a pH value between 0.5 and 5 have been proposed. (e.g., refer to Patent Document 1.)

Patent Document 1: JP-A-07-73878 (page 3, paragraph 0011)

Additionally, methods of immersing hydrogen absorbing alloy powder in an aqueous sodium hydroxide solution with a sodium hydroxide concentration of 30 to 80 wt % at a temperature not lower than 90° C. have been disclosed. (e.g., refer to Patent Document 2.)

Patent Document 2: JP-A-2002-256301 (page 3, paragraph 0009)

According to Patent Documents 1 and 2, the coats of oxide or hydroxide formed on the surfaces of particles of hydrogen absorbing alloy powder are removed to recover clean surfaces and additionally, the hydrogen absorbing alloy powder is activated because a layer containing Ni as main component is formed on the surfaces. Thus, the proposed methods provide an advantage of curtailing the formation process that is executed for the purpose of activation and improving the high-rate discharge ability of the hydrogen absorbing electrode. However, Patent Document 1 only shows the discharge capacity (mAh) while discharging at a rate of 1 ItA at 0° C. (the discharge rate being lower than the discharge rate in the evaluation of the output power performance as will be described hereinafter) as discharge ability at low temperature and does not show any output power performance as determined according to the output power performance of the present invention (the output power performance (W) as determined from the voltage at the tenth second (10 seconds after the start of discharge) as will be described hereinafter). Patent Document 2 only shows the discharge capacity (the ratio relative to the discharge capacity while a discharging at 25° C.) when the discharge takes place with an electric current equivalent to 4 ItA at −10° C. as discharge cut voltage of 0.6 V (which is lower than the discharge cut voltage of 0.8 V according to the present invention as will be described hereinafter) and does not show any output power performance. In short, neither Patent Document 1 nor Patent Document 2 mentions output power performance. Additionally, neither Patent Document 1 nor Patent Document 2 mentions the amount of hydrogen absorbing alloy powder per unit area of a hydrogen absorbing electrode. Therefore, there is a great possibility that neither the method of Patent Document 1 nor that of Patent Document 2 can remarkably improve the output power performance at a low temperature.

Furthermore, the methods of Patent Documents 1 and 2 are accompanied by a disadvantage that, when the charge/discharge cycle is repeated at a high temperature (e.g., 45° C.), the corrosive reaction of hydrogen absorbing alloy powder can be accelerated and oxygen is apt to be generated at the nickel electrode during the charge time if compared with the room temperature to further promote the corrosion of hydrogen absorbing alloy powder so that it is difficult to maintain the cycle performance by either of the methods of Patent Documents 1 and 2.

Hydrogen absorbing electrodes with an improved corrosion resistance of hydrogen absorbing alloy powder without reducing the output power performance obtained by adding a yttrium (Y) compound or a compound of a light rare earth element selected from lanthanum (La), cerium (Ce) and praseodymium (Pr) to the hydrogen absorbing alloy powder of the hydrogen absorbing electrode have also been proposed. (e.g., refer to Patent Document 3.) Hydrogen absorbing electrodes with an effect of inhibiting corrosion of a hydrogen absorbing alloy and an improved durability obtained by making hydrogen absorbing alloy powder immersed in advance with an alkaline aqueous solution or a weakly acidic aqueous solution contain the element of holmium (Ho), erbium (Er), ytterbium (Yb) or thulium (Tm) or a compound of any of them have also been proposed. (e.g., refer to Patent Document 4.)

Patent Document 3: JP-A-11-260361

Patent Document 4: JP-A-09-7588

The additives described in Patent Documents 3 and 4 have an excellent anti-corrosion effect against corrosion of hydrogen absorbing alloy powder. Particularly, corrosion of hydrogen absorbing alloy powder is inhibited to remarkably improve the cycle performance when powder of hydroxide or oxide of Er or Yb is added. However, Patent Document 3 does not mention anything about output power performance and hence the object of the invention of Patent Document 3 is not to improve the output power performance. While Patent Document 4 mentions improvement of output power performance, the invention of Patent Document 4 is intended not to positively improve the output density than ever but to inhibit the reduction of the output density that inevitably arises by inhibiting the phenomenon that the surfaces of particles of hydrogen absorbing alloy powder are covered by a high resistance coat because, when a Y compound is added to hydrogen absorbing alloy powder, the surfaces of particles of hydrogen absorbing alloy powder are inevitably covered by a high resistance coat. The method described in Patent Document 4 can hardly reduce the reaction resistance of a hydrogen absorbing electrode at a low temperature and is not effective for improving the output power performance at a low temperature.

Since the high-rate discharge ability and the charge acceptability of the hydrogen absorbing electrode (negative electrode) is inferior relative to the nickel electrode (positive electrode), the capacity of the negative electrode needs to be sufficiently large relative to the capacity of the positive sufficiently large relative to the capacity of the positive electrode in order to secure a sufficient charge reserve and a sufficient discharge reserve. It is a general practice to select a value between 1.5 and 1.7 for the capacity ratio of the negative electrode capacity to the positive electrode capacity (N/P ratio). The rate of filling an active material per unit area of the hydrogen absorbing electrode of a nickel metal-hydride battery is conventionally set to be between 0.16 and 0.20 g/cm$^2$ in order to confine the N/P ratio to the above range and secure a high capacity.

However, it has been found that, when a large value is selected for the rate of filling an active material in the hydrogen absorbing electrode as in the case of conventional batteries, the reaction resistance of the hydrogen absorbing electrode is high particularly at low temperatures and the target output power performance can hardly be achieved. A conceivable measure to overcome the above problem may be to change the composition of the electrolyte. However, if the output power performance is improved at a low temperature by changing the composition of the electrolyte, other performances including the cycle performance can become degraded.

Alkali batteries having a negative electrode made of a hydrogen absorbing alloy and having a small capacity per unit area (a capacity per unit area of 10 to 40 mAh/cm$^2$) have been proposed. Such an alkali battery can reduce the electric resistance of the negative electrode and improve the discharge ratio for discharges at low temperatures (capacity measured when discharged at a low temperature/battery capacity) when the above capacity value is selected. (e.g., refer to Patent Document 5.)

Patent Document 5: JP-A-11-86898

However, the discharge ratio shown in Patent Document 5 is the value observed while a discharging at 1 CmA (1 ItA) and at 0° C. The discharge rate cited in Patent Document 5 is low if compared with the discharge rate in the evaluation of the output power performance as will be described hereinafter and the Patent Document 5 does not show any output power performance either. The hydrogen absorbing electrode described in Patent Document 5 shows a large reaction resistance because the hydrogen absorbing alloy of the hydrogen absorbing electrode is not highly active as active material and hence the effect thereof on the improvement of performance is small when a high-rate discharge is realized at a low temperature while its charge acceptability is poor in the initial cycles to generate hydrogen to a large extent during a charge and the cycle performance can be degraded probably because the oxygen absorbability is poor and hence the electrolyte is consumed to a large extent.

In a conventional cylindrical nickel metal-hydride battery as shown in FIG. 4, the sealing plate 0 of a lid (the lid having a knob-like cap 6, the sealing plate 0 and a valve 7 arranged in the space defined by the cap 6 and the sealing plate 0, a gasket 5 being mounted at the peripheral edge of the sealing plate 0, the lid being clamped along the peripheral edge thereof by folding the open end of a cylindrical container 4 with a bottom so that the lid and the container are held in airtight contact with each other by way of the gasket 5) that operates as one of the terminals (positive electrode terminal) and the upper current collecting plate (positive electrode current collecting plate) 2 fitted to the upper ends of a rolled electrode assembly are connected to each other by a ribbon-like current collecting lead 12 as shown in FIG. other by a ribbon-like current collecting lead 12 as shown in FIG. 5. For the conventional battery, the current collecting lead needs to be made flexible in order to mount the lid on the open end of the container 4 after welding the ribbon-like current collecting lead 12 and the inner surface of the sealing plate 0 and the current collecting lead 12 and the upper current collecting plate 2. For this reason, the current collecting lead connecting the welded point of the current collecting lead 12 and the inner surface of the sealing plate 0 and the welded point of the current collecting lead 12 and the upper current collecting plate 2 is normally six to seven times longer than the gap between the sealing plate 0 and the upper current collecting plate 2. Thus, the current collecting lead itself has a large electric resistance because of such a length of the current collecting lead. This may be one of the reasons of the low output power performance of the battery.

As described above, there have been attempts to enhance the activeness of hydrogen absorbing alloy powder as active material by surface reforming of hydrogen absorbing alloy powder. However, a satisfactory high output cannot be achieved particularly at low temperatures simply by such an attempt and other performances such as the cycle performance can be degraded by the attempt to enhance the output power performance.

DISCLOSURE OF THE INVENTION

Problem to be Solved by the Invention

In view of the above-identified problem, it is therefore the object of the present invention to provide a sealed nickel metal-hydride battery showing an excellent output power performance at low temperatures that has never been proposed to date while maintaining a good cycle performance.

Means for Solving the Problem

As a result of intensive research efforts for achieving the above object, the inventors of the present invention found that a nickel metal-hydride battery showing a very small reaction resistance of the hydrogen absorbing electrode and an excellent output power performance at low temperatures and satisfying the performance requirements including maintaining the cycle performance can be obtained when a specific value is selected for the saturation mass susceptibility of the hydrogen absorbing alloy powder of the hydrogen absorbing electrode and also a specific value is selected for the filling quantity of hydrogen absorbing alloy powder per unit area and achieved this invention.

The inventors of the present invention analyzed the resistance components that appear when a nickel metal-hydride battery is operated for a high-rate discharge and as a result, made sure that the reaction resistance of the hydrogen absorbing electrode that is the negative electrode takes a large part of the resistance that arises during a high-rate discharge in a nickel metal-hydride battery having a nickel electrode and a hydrogen absorbing electrode operating respectively as positive electrode and negative electrode.

Then, the inventors of the present invention looked into the surface treatment process of hydrogen absorbing alloy in order to improve the charge transfer rate on the alloy surface of the negative electrode during a high-rate discharge and found that the reaction resistance can be remarkably reduced when hydrogen absorbing alloy powder showing a saturation mass susceptibility of not less than 2 emu/g is employed.

The saturation mass susceptibility of ordinary hydrogen absorbing alloy powder is less than 0.1 emu/g. It has been found that a nickel-rich phase is formed as a layer of a thickness of not less than 100 nanometer (nm) on the surfaces of particles of hydrogen absorbing alloy powder when the saturation mass susceptibility is raised to not less than 2 emu/g by immersing hydrogen absorbing alloy powder in a hot NaOH aqueous solution, for instance. It has been confirmed that the phase acts as catalyst for the electrode reaction to reduce the reaction resistance of a hydrogen absorbing electrode formed by using such hydrogen absorbing alloy powder. This effect is particularly remarkable at room temperature.

However, it has also been found that the effect of reducing the reaction resistance is limited when the saturation mass susceptibility is simply raised at a low temperature (e.g., 0° C.). More specifically, the reaction resistance does not fall remarkably when the saturation mass susceptibility of hydrogen absorbing alloy powder is raised to above 2 emu/g and additionally, there arises a problem that the capacity of the alloy falls as the quantity of the magnetic material increases to degrade the cycle life performance accordingly.

As a result of various research activities, the inventors of the present invention found that the reaction resistance of a hydrogen absorbing electrode can be remarkably reduced by employing hydrogen absorbing alloy powder showing a saturation mass susceptibility of not less than 2 emu/g and by making the rate of carrying (also referred to as rate of filling) hydrogen absorbing alloy powder of the hydrogen absorbing electrode not less than 0.15 g/cm$^2$.

It has also been found that, while there is a tendency that the cycle performance is degraded as the rate of carrying hydrogen absorbing alloy powder is reduced and the saturation mass susceptibility is raised, the cycle performance is degraded only slightly and can be held to a desirable level when a value not less than 0.06 g/cm$^2$ and a value not more than 6 emu/g are selected for the rate of carrying and the saturation mass susceptibility respectively.

Still additionally, it has also been found that the length of the current collecting lead can be reduced by welding either the current collecting lead and the lid or the current collecting lead and the upper current collecting plate after sealing the battery and that a nickel metal-hydride battery showing a remarkably excellent output power performance can be realized by employing the hydrogen absorbing electrode for a battery prepared in the above-described manner. The present invention has been made, based on such findings. The above object of the present invention can be achieved by providing the following.

(1) A nickel metal-hydride battery having a nickel electrode and a hydrogen absorbing electrode respectively as positive electrode and negative electrode, characterized in that the hydrogen absorbing electrode is formed by making a conductive support carry hydrogen absorbing alloy powder of rare earth elements and non-rare earth elements including nickel and the saturation mass susceptibility of the hydrogen absorbing alloy powder is 2 to 6 emu/g while the rate at which the hydrogen absorbing electrode carries hydrogen absorbing alloy powder per unit area is 0.06 to 0.15 g/cm$^2$. (See claim 1.)

Note that the saturation mass susceptibility as used herein refers to the value obtained by precisely weighing 0.3 g of hydrogen absorbing alloy powder, filling the powder in a sample holder and measuring the saturation mass susceptibility of the sample by applying a magnetic field of 5 kOe by means of a vibration sample magnetometer manufactured by Riken Electronics (Model BHV-30).

(2) The nickel metal-hydride battery as defined in (1) above, characterized in that the average particle size of the hydrogen absorbing alloy powder is 10 to 35 μm. (See claim 2.)

The particle size of powder as used herein refers to the value obtained by measuring the sample by a laser diffraction/scattering method by means of a Microtrac MT3000 that is available from Nikkiso Co., Ltd. The average particle size as used herein refers to the cumulative average diameter (d 50) that is the value obtained by determining the cumulative curve, taking the entire volume of the powder sample as 100%, and getting the point where the cumulative curve shows the value of 50%.

(3) The nickel metal-hydride battery as defined in (1) or (2) above, characterized in that the hydrogen absorbing electrode contains hydroxide of at least a rare earth element that is either erbium (Er) or ytterbium (Yb). (See claims 3 and 4.)

A compound of Er or Yb exists in the form of hydroxide in the presence of alkali hydroxide. However, when an oxide is added as described hereinafter, all the added oxide is not necessarily changed into a hydroxide in a short period of time in a battery. Therefore, the expression of hydroxide as used herein includes a mixture of a hydroxide and an oxide.

(4) The nickel metal-hydride battery as defined in any one of (1) through (3), characterized in that the nickel metal-hydride battery is a sealed nickel metal-hydride battery having a rolled electrode assembly and a cylindrical container with a bottom sealed by a lid at the open end thereof, the inner surface of the sealing plate of the lid and the top surface of the upper current collecting plate fitted to the upper rolled end of the electrode assembly being connected by way of a current collecting lead and that at least either the welded point of the inner surface of the sealing plate and the current collecting lead or the welded point of the current collecting lead and the upper current collecting plate is welded by energizing between the positive electrode terminal and the negative electrode terminal by means of an external power source by way of the inside of the battery after the sealing. (See claim 5.)

ADVANTAGES OF THE INVENTION

Thus, a nickel metal-hydride battery showing an excellent output power performance and maintaining a good cycle performance can be obtained according to (1) and (2) above.

A nickel metal-hydride battery showing both an excellent output power performance and an excellent cycle performance can be obtained according to (3) above.

A nickel metal-hydride battery showing a particularly excellent output power performance can be obtained according to (4) above.

EXPLANATION OF REFERENCE SYMBOLS

Figure 1:
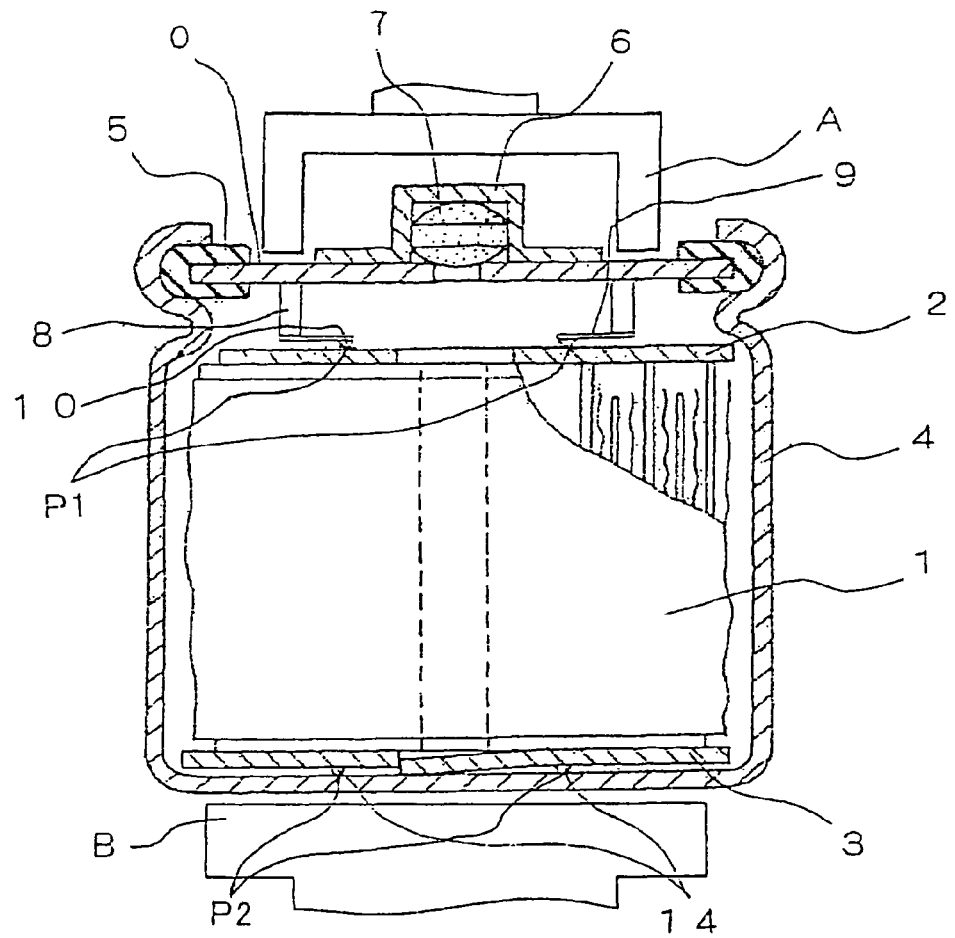
FIG. 1 is a schematic illustration of the structure of a nickel metal-hydride battery according to the present invention and a method of welding the current collecting lead and the upper current collecting plate.

0: sealing plate
1: electrode assembly
2: upper current collecting plate
3: lower current collecting plate
4: container
8: main lead
9: supplementary lead
10, 11, 14: projection
12: ribbon-like lead
A, B: output terminal for external power source (electric resistance welder)
P1: welded point between current collecting lead and upper current collecting plate
P2: welded point between lower current collecting plate and inner surface of bottom of container

BEST MODE FOR CARRYING OUT THE INVENTION

Any hydrogen absorbing alloy may be used for the purpose of the present invention so long as the alloy contains rare earth elements and non-rare earth elements including nickel. The composition of the hydrogen absorbing alloy is not subjected to any particular limitations. For example, a hydrogen absorbing alloy containing rare earth elements selected from La, Ce, Pr, Nr and so on and nickel as principal component elements and having an $AB_5$ type crystal structure or a hydrogen absorbing alloy containing rare earth elements, magnesium (Mg) and nickel as principal component elements and having an $AB_3$ or $AB_{3.5}$ crystalline structure may suitably be used for the purpose of the present invention.

When an $AB_5$ type hydrogen absorbing alloy is employed, an alloy where Ni of $MmNi_5$ (where Mm represents a mischmetal that is a mixture of rare earth elements) is partly substituted by Co, Mn, Al and/or Cu is preferable because such an alloy shows an excellent cycle life performance and a high discharge capacity.

The hydrogen absorbing electrode of a nickel metal-hydride battery according to the present invention is formed by making a conductive support such as a nickel-plated punched steel plate carry hydrogen absorbing alloy powder. The saturation mass susceptibility of the hydrogen absorbing alloy powder to be used for the hydrogen absorbing electrode of a nickel metal-hydride battery according to the present invention is as high as 2 to 6 emu/g if compared with the saturation mass susceptibility of ordinary hydrogen absorbing alloy that is not higher than 0.1 emu/g. Preferably, the saturation mass susceptibility of the hydrogen absorbing alloy powder is between 4 and 6 emu/g in order to remarkably reduce the reaction resistance of the hydrogen absorbing electrode, while maintaining the cycle performance.

Hydrogen absorbing alloy powder showing a high saturation mass susceptibility as described above can be obtained by immersing hydrogen absorbing alloy powder in a hot aqueous alkaline solution. Such an immersion is referred to as surface forming process hereinafter. When hydrogen absorbing alloy powder is observed after immersing the powder in an aqueous alkaline solution, it will be found that a nickel-rich phase is formed as a layer on the surfaces of particles of hydrogen absorbing alloy powder. More specifically, a nickel-rich phase is formed as a layer having a thickness not less than about 100 nm on the surfaces of particles of hydrogen absorbing alloy powder showing a saturation mass susceptibility of not less than 2 emu/g. It will be safe to assume that the layer acts as a catalyst that accelerates the electrode reaction of the hydrogen absorbing electrode to improve the high-rate discharge ability of the hydrogen absorbing electrode. The layer of the nickel-rich phase formed on the surfaces of particles of hydrogen absorbing alloy powder is referred to as catalyst layer hereinafter.

As alkaline solution to be used for an immersion treatment of hydrogen absorbing alloy powder, an alkali hydroxide or a mixture of more than one alkali hydroxides such as KOH, NaOH and/or LiOH to be used as electrolyte is preferably used for the purpose of the present invention because the composition ratio of the component of eluted elements is similar to that of the electrolyte and hence the corrosion of the alloy in the battery hardly progresses. Of the above listed alkali hydroxides, NaOH is particularly preferable because the rate of corroding the alloy surface of NaOH is twice as high as that of LiOH so that the treatment time can be reduced remarkably. NaOH is also preferable because NaOH can realize a hydrogen absorbing electrode that is excellent in terms of both high-rate discharge capability and charge/discharge cycle capability probably because a uniform and dense catalyst layer is formed on the surfaces of particles of the hydrogen absorbing alloy if compared with KOH.

While the NaOH concentration of the NaOH aqueous solution to be used for the surface reforming process is not subjected to any particular limitations, higher NaOH concentration accelerates corrosion faster. The NaOH concentration is preferably not less than 28 wt % to improve the processing rate and reduce the processing time. There arises a problem that crystal of sodium hydroxide becomes deposited when the temperature of the treatment solution is lowered to room temperature to make it difficult to separate and remove sodium hydroxide from hydrogen absorbing alloy powder after an immersion treatment if the NaOH concentration exceeds 50 wt %. Therefore, the NaOH concentration of the NaOH aqueous solution to be used for an immersion treatment is preferably between 28 and 50 wt %. The immersion treatment is preferably conducted at a high temperature to raise the processing rate of the immersion treatment. While a temperature level lower than 90° C. is effective for removing the oxides and the hydroxides produced on the surfaces of particles of hydrogen absorbing alloy powder, a long immersion time is required to form a catalyst layer on the surfaces of particles of hydrogen absorbing alloy powder for the purpose of the present invention. Therefore, a low temperature level is not feasible for the immersion treatment. Thus, the temperature of the treatment solution is set to be between 90 and 110° C. to form a catalyst layer in a short time.

The rate per unit area of filling an electrode with hydrogen absorbing alloy powder to form a hydrogen absorbing electrode having a conductive support made to carry hydrogen absorbing alloy powder is conventionally between about 0.16 and 0.20 g/cm$^2$ (a state showing such a filling rate may be referred to the status quo hereinafter for the sake of convenience). To the contrary, a low rate between 0.06 and 0.15 g/cm$^2$ per unit area is selected for filling an electrode with hydrogen absorbing alloy powder for the purpose of the present invention. With this arrangement, the reaction resistance of the hydrogen absorbing electrode can be reduced remarkably if compared with the prior art. The rate per unit area of filling an electrode with hydrogen absorbing alloy powder is preferably between 0.07 and 0.15 g/cm$^2$, more preferably between 0.09 and 0.15 g/cm$^2$ in order to maximally inhibit the degradation of the cycle performance.

As for the particle size of the hydrogen absorbing alloy powder to be used for a hydrogen absorbing electrode for the purpose of the present invention, the average particle size is preferably between 10 and 35 µm, more preferably between 10 and 28 µm. The corrosion resistance relative to the electrolyte is poor and a good cycle performance cannot be achieved when the average particle size is less than 10 µm. On the other hand, the reaction resistance rises because the mother phase is large and hence the surface layer cannot operate satisfactorily as catalyst when the average particle size exceeds 35 µm. Additionally, the hydrogen absorbing alloy powder can become micronized to produce new surfaces and accelerate corrosion when the charge/discharge cycle is repeated. While a crusher and a classifier are employed to obtain hydrogen absorbing alloy powder with predetermined particle profiles, the crushing method and the classification method to be used for the purpose of the present invention are not subjected to any particular limitations.

The negative electrode active material that is the principal component of the negative electrode is described in detail above. However, the hydrogen absorbing electrode may additionally contain other components such as an electric conductor, a binding agent, a thickener, an anti-corrosion agent, a filler and so on.

Corrosion of hydrogen absorbing alloy can be inhibited to remarkably improve the cycle performance of a nickel metal-hydride battery having a hydrogen absorbing electrode formed by using such a hydrogen absorbing alloy by adding Y or a lanthanoid, or a so-called heavy rare earth element, selected from Dy, Ho, Er, Tm, Yb and Lu to the hydrogen absorbing alloy powder. Particularly, powder of oxide or hydroxide of Er or Yb may preferably be used because the powder can provide an excellent anti-corrosive effect against corrosion of hydrogen absorbing alloy powder when the powder is added to and mixed with the hydrogen absorbing alloy powder. More particularly, powder of oxide or hydroxide of Er is effective for improving the cycle performance, while maintaining the high output level, because it practically does not increase the reaction resistance of the hydrogen absorbing electrode. On the other hand, powder of oxide or hydroxide of Yb provides an even more remarkable anti-corrosive effect if compared with powder of oxide or hydroxide of Er when it is added to the hydrogen absorbing alloy powder, although the reaction resistance of the hydrogen absorbing electrode may increase slightly and the output power performance of the electrode may fall slightly. Therefore, powder of oxide or hydroxide of Er may preferably be added when a high output power performance is to be emphasized, whereas powder of oxide or hydroxide of Yb may preferably be added when the cycle performance is to be stressed.

To achieve a remarkable anti-corrosion effect, powder of oxide or hydroxide of Er or Yb is preferably subjected to a crushing/classifying process in advance before it is added to hydrogen absorbing alloy powder so as to turn the powder of oxide or hydroxide of Er or Yb into micro powder having an average particle size (d 50) of 0.3 to 5 µm. The ratio of addition of such powder is preferably 0.3 to 1.5 weight portions relative to 100 weight portions of hydrogen absorbing alloy powder. No anti-corrosion effect can be achieved when the ratio of addition is less than 0.3 weight portions, whereas the filling rate of hydrogen absorbing alloy powder can fall to reduce the capacity and/or the reaction resistance of the hydrogen absorbing electrode may increase when the ratio of addition exceeds 1.5 weight portions.

Preferably, the purity of an oxide or hydroxide of Er or Yb to be added (weight percentage of Er or Yb of the rare earth element contained in the compound) is 90% or more. If the purity is less than 90%, the anti-corrosion effect of the added compound may be degraded.

While any electron conducting auxiliary material may be used without limitations so long as it is made of an electron conducting material and does not adversely affect the performance of the battery, an electron conducting material normally selected from natural graphite (scale-like graphite, clay-like graphite), artificial graphite, carbon black, acetylene black, ketchen black, carbon whisker, carbon fiber, gas phase developed carbon, metal (copper, nickel, gold and so on) powder, metal fiber and so on or a mixture of more than one of them may preferably be used for the purpose of the present invention. Of the above-listed substances, ketchen black is particularly preferable from the viewpoint of electron conductivity and applicability for coating. The rate at which such an electric conductor is added is preferably 0.1 to 2 wt % relative to the total weight of the positive electrode or the negative electrode so as not to remarkably reduce the capacity of the negative electrode, while maintaining the electric conductivity. Particularly, the use of ketchen black crushed to ultra micro particles of 0.1 to 0.5 µm is desirable to reduce the necessary amount of carbon.

Usually the binding agent may include one, or two or more in combination selected from thermoplastic resins such as polytetrafluoroethylene (PTFE), polyethylene, polypropylene and polymers showing a rubber-like elasticity such as ethylene-propylene-dieneterpolymer (EPDM), sulfonated EPDM, styrenebutadiene rubber (SBR), fluorine rubber. The rate at which such a binding agent is added is preferably 0.1 to 3 wt % relative to the total weight of the positive electrode or the negative electrode.

Usually the thickener may include one, or two or more in combination selected from polysaccharides such as carboxymethylcellulose (CMC), methylcellulose (MC), hydroxypropylmethylcellulose (HPMC) and so on. The rate at which such a thickener is added is preferably 0.1 to 3 wt % relative to the total weight of the positive electrode or the negative electrode.

Any filler can be used for the purpose of the present invention so long as the filler does not adversely affect the performance of the battery. Filler may generally include olefin polymers such as polypropylene, polyethylene and so on, carbon and so on. The rate at which such a filler is added is preferably not more than 5 wt % relative to the total weight of the positive electrode or the negative electrode.

Powder of an active material formed by using nickel hydroxide powder obtained by solid-solubilizing Zn and Co by several wt % as core layers and coating the surfaces thereof with a conductive cobalt compound of a higher order (oxy cobalt hydroxide) may preferably be used for the positive electrode (nickel electrode). Additionally, powder of oxide or hydroxide of a rare earth element such as Er or Yb may preferably be added to the powder of the active material in order to improve the charge efficiency at a high temperature (e.g. 45° C.) and inhibit the decomposition of the electrolyte and the generation of oxygen at the positive electrode that takes place at the time of the decomposition.

Both the positive electrode and the negative electrode can be prepared appropriately by mixing the active material, the electric conductor and the binding agent with water and an organic solvent such as alcohol, toluene or the like, subsequently applying the obtained mixture solution to a conductive support, which will be described in greater detail hereinafter, and drying the mixture solution. Methods of application that can be used for applying the mixture solution include roller coating by means of an applicator roll, screen coating, doctor blade method, spin coating, and the use of a bar coater in order to make the applied layer show a desired thickness and a desired profile, although the methods are not limited to the above-cited ones.

Any electron conductor may be used for the conductive support so long as the conductor does not adversely affect the prepared battery. Examples of conductive support include nickel plates and nickel-plated steel plates as well as foam, molded bundle of fibers, three-dimensional substrates formed to convexo-concave and two-dimensional substrates such as punched steel plates. While the thickness of the conductive support is not subjected to any particular limitations, a conductive support having a thickness of 5 to 700 µm may preferably be used. A conductive support made of Ni that is excellent in corrosion resistance relative to alkali and oxidation resistance and formed to a foam having a porous structure that is excellent in terms of current collecting function and active material holding function may preferably be used. More particularly, it is preferable to use a punched plate (punched object) formed by plating an iron foil with Ni to improve the reducing effect for the conductive support of the hydrogen absorbing electrode (negative electrode) because such an object is less costly and excellently conductive. The diameter of the holes produced by punching of the punched plate is preferably not greater than 1.7 mm and the aperture ratio thereof is preferably not less than 40%. With such an arrangement, the negative electrode active material and the conductive support excellently adhere to each other with the use of a small amount of binding agent.

A conductive support whose surface is treated by adhering Ni powder, carbon or platinum to the surface for the purpose of improving the adhesiveness, the electro-conductivity and the oxidation resistance may be used beside baked carbon and a conductive polymer. The surface may be oxidation-treated when such materials are used.

As for the separator of a nickel metal-hydride battery, porous membrane, non-woven fabric or a combination of them may be used for the separator because those materials show an excellent high-rate performance. The material of porous membrane or non-woven fabric can be selected from polyolefin resins such as polyethylene (PE) and polypropylene (PP) and nylon.

The porosity of the separator is preferably not higher than 80 vol % from the viewpoint of securing a sufficient strength of the separator, preventing internal short-circuiting due to the electrode running through the separator and securing a sufficient gas permeability of the separator. On the other hand, the porosity of the separator is preferably not less than 20 vol % from the viewpoint of reducing the electric resistance of the separator and securing an excellent high rate characteristic. The separator is preferably subjected to a treatment for improving the hydrophilicity thereof.

For example, a separator that is made of polyolefin resin such as polyethylene (PE) and whose surface is subjected to a sulfonation treatment, a corona treatment or a PVA treatment may be used. Alternatively, a mixture containing a resin material subjected to such a treatment may be used for the separator.

Any electrolyte proposed for use in alkali batteries may be used for the purpose of the present invention. Water may be employed as solvent for the electrolyte and a solute that is potassium (K), sodium (Na) or lithium (Li) or a mixture of two or more than two of them may be used as solute for the electrolyte, although the present invention by no means limited thereto. A preferable example of electrolyte for preparing a battery showing excellent battery performance is an aqueous solution containing KOH by 5 to 7 mol/dm$^3$ and LiOH by 0.1 to 0.8 mol/dm$^3$.

A nickel metal-hydride battery according to the present invention is suitably prepared typically by injecting an electrolyte before or after stacking a positive electrode, a separator and a negative electrode as so many layers and ultimately sealing the battery by means of a coat material. In the case of a nickel metal-hydride battery prepared by winding the power generating elements formed by stacking a positive electrode, a negative electrode and a separator as so many layers, an electrolyte is preferably injected into the power generating elements before and after winding them. While the electrolyte can be injected under normal pressure, vacuum impregnation, pressure impregnation or centrifugal impregnation may alternatively be used.

Outer packaging materials that can be used for a nickel metal-hydride battery according to the present invention include nickel-plated iron, stainless steel and polyolefin resin.

The structure of a nickel metal-hydride battery according to the present invention is not subjected to any particular limitations. Examples of structure that can be used for the purpose of the present invention include coin batteries and button batteries having a positive electrode, a negative electrode and a single-layer or multilayer separator, square-shaped batteries and flat batteries. However, a cylindrical battery having a rolled electrode assembly formed by winding a positive electrode, a negative electrode and a separator into a roll is preferable because it has a minimum number of electrode plates and the area of its electrodes is maximized.

In a cylindrical nickel metal-hydride battery according to the present invention, the inner surface of the sealing plate 0 to whose outer surface a cap 6 that operates as terminal of either the positive electrode or the negative electrode is bonded and the upper current collecting plate 2 are connected by a lead as shown in FIG. 1. According to the present invention, after containing the electrode assembly 1, to which the upper current collecting plate 2 and the lower current collecting plate 3 are fitted, in a bottomed cylindrical metal-made container 4, injecting the electrolyte by a predetermined quantity and bonding the lower current collecting plate 3 and the inner surface of the bottom of the container 4 by electric resistance welding, the sealing plate 0, to which a lead (including a main lead 8 and a supplementary lead 9 in the instance illustrated in FIG. 2) is bonded at the inner surface thereof while the cap 6 that operates as one of the terminal of the battery is bonded at the outer surface thereof and in which a valve 7 that is a safety valve is arranged at the inside of the cap while a gasket 5 is arranged around the peripheral edge thereof, is mounted on the upper side of the upper current collecting plate. Then, the open end of the container 4 is folded along the edge thereof to clamp the gasket and subsequently one of the output terminal, or terminal A (also referred to as electrode bar), of the electric resistance welder is brought into contact with the outer surface of the sealing plate 0 (or the cap 6), while the other output terminal B of the electric resistance welder is brought into contact with the outer surface of the bottom of the container 4 in order to weld the lead and the upper current collecting plate 2 by flowing an electric current necessary for the welding by way of the inside of the battery. Since the lead and the upper current collecting plate 2 are welded under a condition where the sealing plate is rigidly anchored to the open end of the container in advance, it is not necessary to provide the lead with an extra curvature unlike the prior art and hence the length of the lead connecting the sealing plate and the upper current collecting plate can be minimized to reduce the electric resistance of the lead if compared with the prior art. For the nickel metal-hydride battery to satisfy the requirements of the output power performances of power sources of HEVs with a wide margin, the ratio of the length of the current collecting lead between the welded point of the current collecting lead and the sealing plate 0 and the welded point P1 of the current collecting lead and the upper current collecting plate 2 to the gap between the sealing plate 0 and the upper current collecting plate 2 is preferably not larger than 2.1, more preferably not larger than 1.7. It is desirable that the electric current necessary for the welding that is flowing by way of the inside of the battery is an AC pulse current because such an electric current can minimize the decomposition of the electrolyte that arises due to the electric current.

Figure 2:
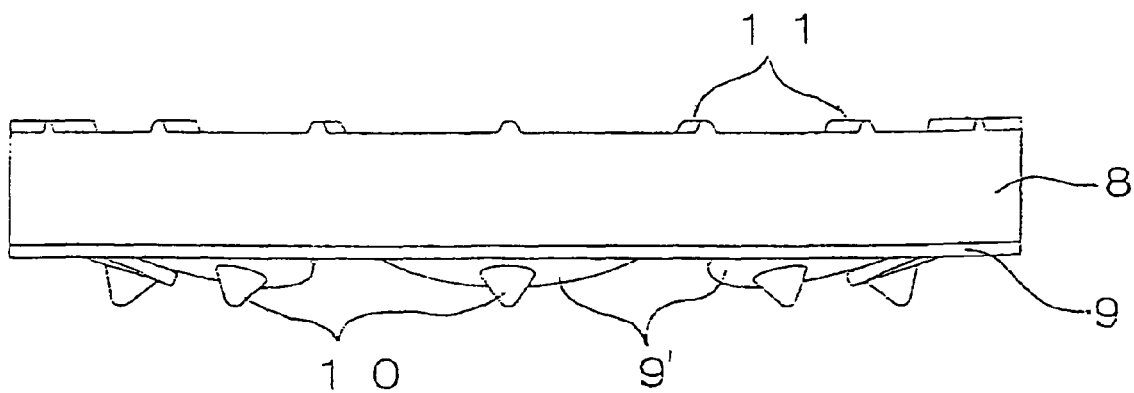
FIG. 2 is a schematic illustration of an example of a current collecting lead that can be used for a nickel metal-hydride battery according to the present invention.

FIG. 2 is a schematic illustration of an example of the collecting lead. The lead typically includes a ring-shaped main lead 8 and a supplementary lead 9 and one of the ends of the main lead 8 is provided with a plurality of projections 11 for promoting the bonding to the sealing plate by electric resistance welding whereas the other end is bonded to the supplementary lead 9. The supplementary lead 9 has a plurality of jutted chips 9' projecting from the ring of the ring-shaped main lead 8 toward the inside (which jutted chips may be projecting toward the outside of the ring) and each of the jutted chips 9' has a projection 10 that ensures a good welding between the jutted chip and the upper surface of the upper current collecting plate 2 by electric resistance welding. As shown in FIG. 2, the jutted chips project downward from the main lead 8 and are resilient relative to vertical deformations. Therefore, if the electrode assembly 1 shows a height error (deviation), the projections 10 and the upper current collecting plate 2 are stably held in contact with each other under pressure due to the resiliency of the jutted chips that are pressed from below so that the lead and the upper current collecting plate 2 can be reliably bonded to each other by electric resistance welding.

Figure 3:
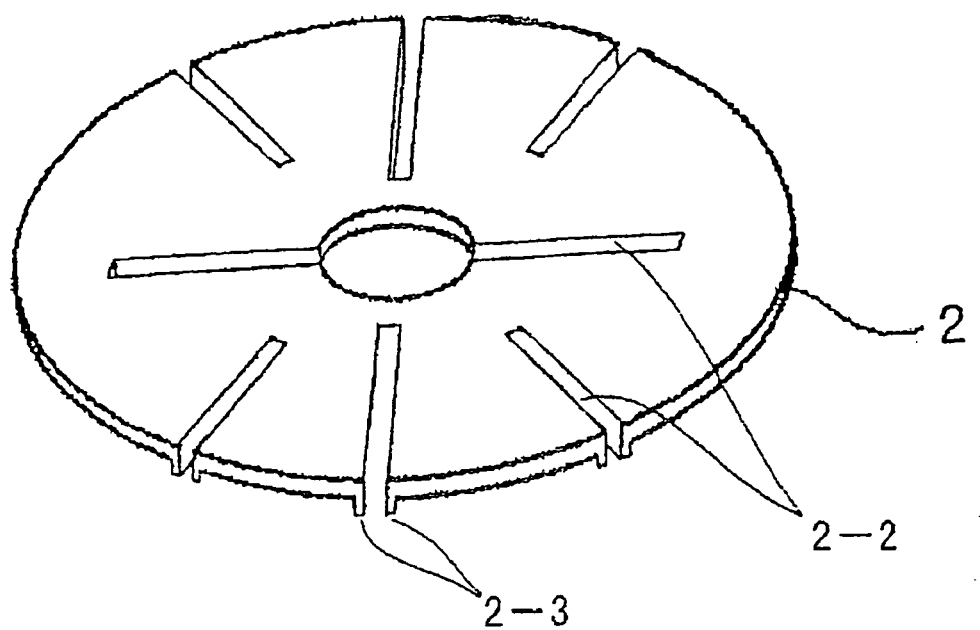
FIG. 3 is a schematic illustration of an example of an upper current collecting plate that can be used for a nickel metal-hydride battery according to the present invention.
Figure 4:
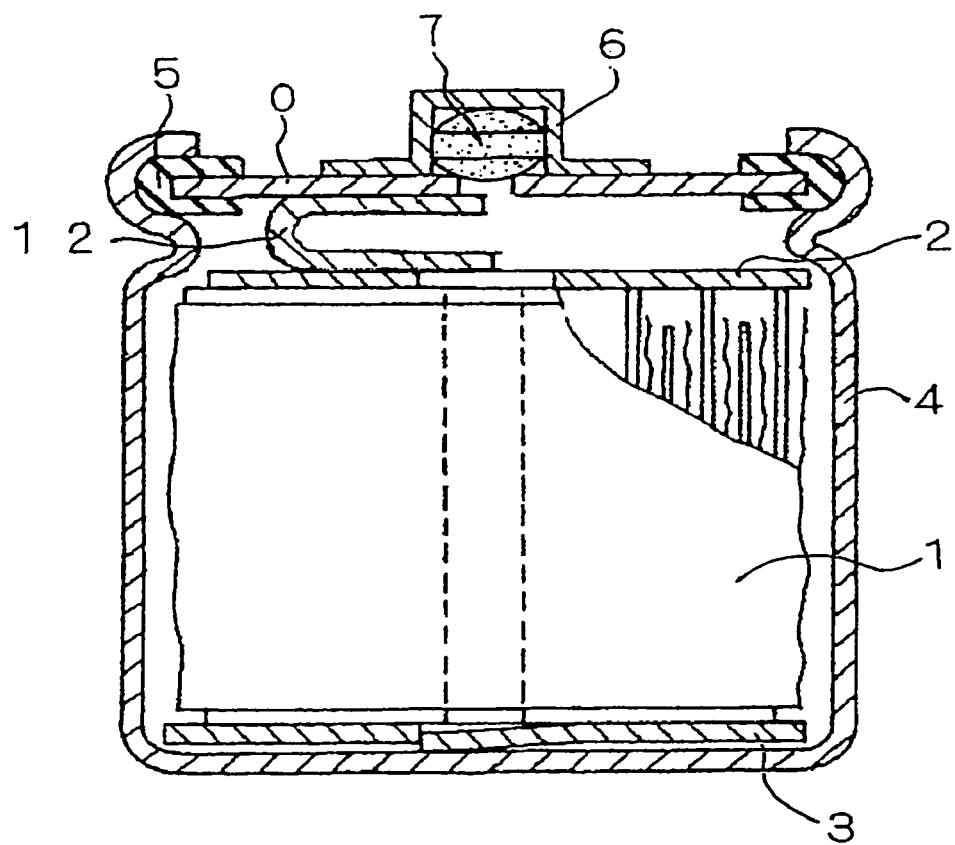
FIG. 4 is a schematic illustration of the cross-sectional structure of a conventional cylindrical nickel metal-hydride battery.

As shown in FIG. 3, the upper current collecting plate 2 is disk-shaped and has a central through hole and a plurality of radial slits 2-2 extending from the center of the plate. The slits can effectively reduce the idle current that arises when bonding the upper current collecting plate to a rolled end of the electrode assembly by electric resistance welding. The ridges 2-3 extending downward from the opposite edges of each slit runs subsequently orthogonal relative to the edge of the corresponding long side of the electrode plate projecting to the rolled ends of the electrode assembly and becomes bonded to the latter. The radius of the upper current collecting plate 2 is preferably substantially equal to the radius of the rolled electrode assembly 1 (but the upper current collecting plate does not go beyond the outer boundary of the rolled end of the electrode assembly) and the center of the circular upper current collecting plate preferably agree with the center of the circularly rolled end fact of the electrode assembly so that the ridges and the edges of the corresponding long sides of the electrode plates may intersect each other over the entire area defined by the edges of the corresponding long sides.

The lead and the upper current collecting plate 2 are preferably bonded to each other at a plurality of welded points (P1 in FIG. 1). The number of welded points can vary depending on the size of the battery and hence is not subjected to limitations, although it is preferably between 2 and 16, more preferably between 4 and 16. The welded points are preferably arranged at regular intervals on a circle or a plurality of circles concentric with the current collecting plate in order for the distance from each part of the electrode plates to the corresponding welded point to remain the same for all the welded points. The ratio of the distance from the welded points to the center of the upper current collecting plate to the radius of the electrode assembly 1 is preferably between 0.4 and 0.7 since such a ratio provides an excellent output power performance because the welded points are then found in a central part of the long edges of the electrode plates to probably enhance the current collecting function.

The lower current collecting plate 3 and the inner surface of the bottom of the container 4 are preferably bonded to each other at a plurality of welded points P2 as shown in FIG. 1. Like the upper current collecting plate 2, the lower current collecting plate 3 is also disk-shaped and has a plurality of radial slits extending from the center of the plate. However, unlike the upper collecting plate 2, the lower collecting electrode 3 is provided with a plurality of projections 14 at the center and at off-center positions in order to provide good welding between the lower current collecting plate 3 and the inner surface of the bottom of the container 4. While the number of the projections 14 arranged at off-center positions can vary depending on the size of the battery and hence is not subjected to limitations, it is preferably between 2 and 16, more preferably between 4 and 16, in order to minimize the electric resistance between the lower current collecting plate and the container 4. The ratio of the distance from the plurality of welded points P2 to the center of the lower current collecting plate to the radius of the electrode assembly 1 is preferably between 0.5 and 0.8 since such a ratio provides an excellent output power performance because the welded points are then found in a central part of the long edges of the electrode plates to probably enhance the current collecting function.

EXAMPLES

Now, the present invention will be described further by way of examples, although the present invention is by no means limited by the examples. The test method, the material of the positive electrode and that of the negative electrode as well as the positive electrode, the negative electrode, the electrolyte, the separator and the profile of the battery may be appropriately selected. As for the capacity of each of the electrodes of the examples, a simple formula of multiplication of capacity (mAh)=quantity (g) of filled active material×289 mAh/g and a simple formula of multiplication of capacity (mAh)=quantity (g) of filled active material (hydrogen absorbing alloy powder)×290 mAh/g were used for the nickel electrode (positive electrode plate) and the hydrogen absorbing electrode (negative electrode plate) respectively.

(Preparation of Hydrogen Absorbing Alloy Powder)

Hydrogen absorbing alloy powder A having an average particle size of 20 μm and a composition expressed by $MmNi_{4.0}Co_{0.55}Al_{0.35}Mn_{0.30}$ (where Mm represents a mischmetal of a mixture expressed by the weight ratio of La:Ce:Pr:Nd=70:22:2:6) was immersed in an NaOH aqueous solution showing a concentration of 48 wt % at 100° C. Subsequently, the solution was filtered under pressure to separate the treatment solution from the alloy. Then, pure water was added by the weight equal to the weight of the alloy and the mixture was subjected to ultrasonic of 28 KHz for 10 minutes. Then, pure water was injected from a lower part of a stirrer tank and flown from an upper part thereof. Pure water was made to flow through the stirrer tank in this way to remove free rare earth hydroxides from the alloy powder. Thereafter, the alloy powder was washed with water until the pH value falls below 10 and filtered under pressure. Then, the alloy powder was exposed to hot water at 80° C. to eliminate hydrogen. The hot water was filtered under pressure and the alloy powder was once again washed with water and cooled to 25° C. Then, 4% hydrogen peroxide was added by the weight same as the alloy, while stirring the mixture, to eliminate hydrogen and obtain hydrogen absorbing alloy for an electrode. Five time levels of 0 hours, 1.3 hours, 2.6 hours, 4 hours and 5.3 hours were used as durations of the immersion treatment to obtain hydrogen absorbing alloy powders A, B, C, D and E that correspond to the respective durations of the immersion treatment. The saturation mass susceptibilities of the obtained hydrogen absorbing alloy powders are listed in Table 1 below.

TABLE 1

| Hydrogen absorbing alloy powder classification | Duration of immersion treatment (hours) | Saturation mass susceptibility (emu/g) |
|---|---|---|
| Powder A | 0 | 0.06 |
| Powder B | 1.3 | 2 |
| Powder C | 2.6 | 4 |
| Powder D | 4 | 6 |
| Powder E | 5.3 | 8 |

(Single Electrode Test of Hydrogen Absorbing Electrode)

The hydrogen absorbing alloy powders A, B, C, D and E were used to prepare specimens of hydrogen absorbing electrode and the reaction resistance of each of the specimens of hydrogen absorbing electrode was evaluated. Seven levels of rate of filling hydrogen absorbing alloy powder including five levels of 0.04 g/cm$^2$, 0.06 g/cm$^2$, 0.07 g/cm$^2$, 0.09 g/cm$^2$ and 0.15 g/cm$^2$ for hydrogen absorbing electrodes according to the present invention and two status quo levels of 0.18 g/cm$^2$ and 0.20 g/cm$^2$ were defined. More specifically, for each of the specimens, 1 weight portion of $Er_2O_3$ powder showing an average particle size of 5 μm, 0.65 weight portions of styrenebutadiene copolymer (SBR), 0.3 weight portions of hydroxypropylmethylcellulose (HPMC) and a predetermined quantity of water were added to 100 weight portions of hydrogen absorbing alloy powder and the mixture was kneaded to produce paste of the mixture. The paste was then applied to a negative electrode substrate that was a punched and nickel-plated steel plate having a thickness of 0.05 mm, an aperture diameter of 1.5 mm and an aperture ratio of 40% by means of a blade coater and subsequently dried at 80° C. Then, the negative electrode was pressed to make the electrode plate show a porosity of 20% and obtain a 30 mm-width hydrogen absorbing electrode. The size (length) of the electrode was adjusted to make the capacity {290 mAh/g×amount of filling (g)} equal to 200 mAh as computed from the amount of filling of hydrogen absorbing alloy.

The alloy electrode and a nickel electrode that was made to show a width and a length larger than those of the hydrogen absorbing electrode for a single electrode test and have a capacity per side subsequently equal to that of the negative electrode plate were arranged with a sulfonated non-woven fabric separator having a thickness of 120 μm and made of polypropylene interposed between them at the opposite side of the negative electrode so as to sandwich the latter. Then, an aqueous solution containing KOH at a rate of 6.8 mol/dm$^3$ and LiOH at a rate of 0.8 mol/dm$^3$ was injected as electrolyte to prepare a cell for a single electrode test that contains liquid excessively.

Figure 6:
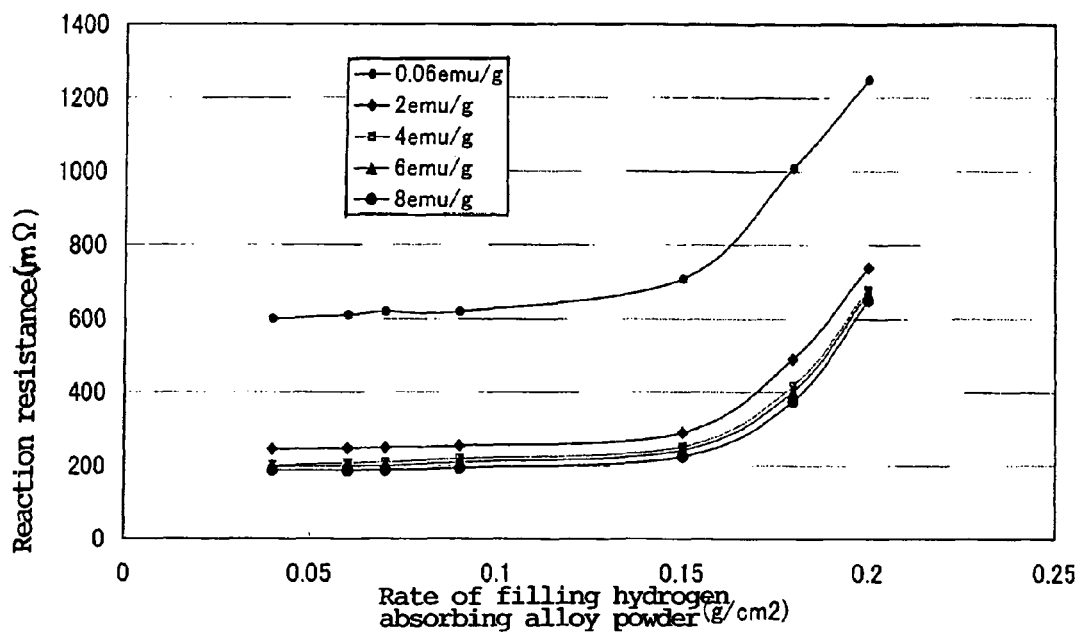
FIG. 6 is a graph illustrating the relationship among the reaction resistance of the single electrode of the hydrogen absorbing electrode, the saturation mass susceptibility of the hydrogen absorbing alloy powder and the amount per unit area of the filled hydrogen absorbing alloy powder of a nickel metal-hydride battery according to the present invention.

The prepared battery was stored in an atmosphere of 25° C. for 12 hours and charged at 4 mA (0.02 ItA) for 3 hours and then at 20 mA (0.1 ItA) for 10 hours before it was discharged to −0.6 V relative to a reference electrode (Hg/HgO electrode) at 40 mA (0.2 ItA). Subsequently, the operation of charging the battery at 20 mA (0.1 ItA) for 12 hours and discharging it to −0.6 V at 40 mA (0.2 ItA) was repeated four times. Thereafter, the battery was charged at 20 mA (0.1 ItA) for 12 hours and left at 0° C. for 4 hours before it was discharged at 1,000 mA (5 ItA) for 10 seconds. The DC resistance value (mΩ) was computationally determined from the rise of the negative electrode potential from 0.001 to 10 seconds since the start, using the potential of the reference electrode (Hg/HgO electrode) as reference. The DC resistance value used as reaction resistance value. FIG. 6 shows the results of the test.

As seen from FIG. 6, the reaction resistance is high regardless if the rate of filling (g/cm$^2$) the hydrogen absorbing electrode with hydrogen absorbing alloy powder is changed when the saturation mass susceptibility of the hydrogen absorbing alloy is 0.06 emu/g. The reaction resistance rises rapidly when the filling rate exceeds 0.15 g/cm$^2$ if the saturation mass susceptibility of the hydrogen absorbing alloy is not less than 2 emu/g. Thus, it was found that the reaction resistance value can be reduced and stabilized (to show a small range of fluctuations) when the saturation mass susceptibility of the hydrogen absorbing alloy is not less than 2 emu/g and the rate of filling it is not more than 0.15 g/cm$^2$.

The reason for this is not clear but the inventors of the present invention propose the following theory. The magnetic material formed on the surfaces of particles of the hydrogen absorbing alloy powder operates as catalyst for transfer of charge. Therefore, the reaction resistance falls as the quantity of the magnetic material and hence the saturation mass susceptibility increases. However, the area of the electrode is reduced relative to the quantity of the alloy as the filling quantity rises to consequently reduce the interface with the electrolyte and hence raise the reaction resistance. Thus, it may be safe to assume that a hydrogen absorbing electrode showing a remarkably reduced reaction resistance can be obtained when the saturation mass susceptibility of the hydrogen absorbing alloy is not less than 2 emu/g and the filling rate is not more 0.15 g/cm$^2$.

(Preparation of a Cylindrical Nickel Metal-Hydride Battery and Evaluation of Battery Performance)

(Preparation of Positive Electrode Plate)

An amine complex was produced by adding ammonium sulfate and sodium hydroxide solution to an aqueous solution produced by dissolving nickel sulfate, zinc sulfate and cobalt sulfate at a predetermined ratio. Additionally, caustic soda was dropped into the solution, while stirring the latter fiercely, to synthesize spherical high density nickel hydroxide particles that operate as core mother material and show a ratio of nickel hydroxide:zinc hydroxide:cobalt hydroxide=88.45: 5.12:1.1 by controlling the pH of the reaction system to 11 to 12.

The obtained high-density nickel hydroxide particles were dropped into an alkaline aqueous solution whose pH was controlled to 11 to 12 by means of sodium hydroxide. Then, an aqueous solution containing cobalt sulfate and ammonium sulfate to predetermined concentrations was dropped, while stirring the solution. During the operation, an aqueous solution of sodium hydroxide was dropped appropriately to maintain the pH of the reaction bath to the range from 11 to 12. The pH was held to the range from 11 to 12 for about an hour to form a surface layer of a hydroxide mixture containing Co on the surfaces of the nickel hydroxide particles. The ratio of the surface layer of the hydroxide mixture relative to the core mother particles (to be simply referred to as core layer hereinafter) was 4.0 wt %.

50 g of nickel hydroxide particles having a surface layer of the hydroxide mixture was put into an aqueous solution of 30 wt % sodium hydroxide (10 mol/dm$^3$) at 110° C. and the mixture was thoroughly stir. Subsequently, $K_2S_2O_8$ was added at an excessive rate relative to the equivalent of the cobalt hydroxide contained in the surface layer to confirm that oxygen gas was generated from the surfaces of the particles. The obtained particles were filtered, washed with water and dried to produce powder of an active material.

An aqueous solution of carboxymethylcellulose (CMC) was added to mixture powder of the above active material powder and Yb (OH) 3 powder showing an average particle size of 5 μm to produce a pasty material showing a weight ratio of the active material powder:Yb(OH)$_3$ powder:CMC (solid ingredient)=100:2:0.5. The paste was filled into a nickel porous body of 450 g/m$^2$ (Nickel Cellmet #8: manufactured by Sumitomo Electric Industries). Then, the porous body filled with the paste was dried at 80° C. and pressed to show a predetermined thickness. Thus, a nickel positive electrode plate having a width of 48.5 mm, a length of 1,100 mm and a capacity of 6,500 mAh (6.5 Ah) and provided with an active material-free zone having a width of 1.5 mm and extending along one of the long sides of the plate was obtained. The positive electrode plate was used as common positive electrode plate of Examples 1 through 3, Examples 13 through 15, Example 17, Comparative Example 1, Comparative Example 2, Reference Example 1, Reference Example 2 and Reference Example 4. (The thickness and the length of the positive electrode plate was adjusted in Examples 4 through 12, Example 16, Comparative Examples 3 through 12 and Reference Example 3 according to the rate per unit area of filling the negative electrode plate with hydrogen absorbing alloy powder.)

(Correlation of Reaction Resistance in Single Electrode Test and Battery Performance)

Cylindrical nickel metal-hydride batteries were prepared as specimens for performance evaluations by using hydrogen absorbing electrodes showing a filling rate of 0.07 g/cm$^2$ that stabilized the reaction resistance (and hence showed little fluctuations in the reaction resistance if the filling rate was accompanied by an error) and different saturation mass susceptibilities of hydrogen absorbing alloy powder in order to look into the correlation of the reaction resistance of the single electrode of hydrogen absorbing electrode and the output power performances of the battery. The cycle performance of each of the specimens was evaluated along with the output power performances.

Example 1

Preparation of Negative Electrode Plate

A hydrogen absorbing electrode plate was prepared with a rate of filling hydrogen absorbing alloy powder per unit area of 0.07 g/cm$_2$, using the hydrogen absorbing alloy powder C. More specifically, 1 weight portion of $Er_2O_3$ showing an average particle size of 5 μm, 0.65 weight portions of styrenebutadiene copolymer, 0.3 weight portions of hydroxylpropylmethylcellulose (HPMC) and a predetermined quantity of water were added to 100 weight portions of hydrogen absorbing alloy powder and the mixture was kneaded to produce paste of the mixture. Then, the paste was applied to a negative electrode substrate of a punched and nickel-plated steel plate and subsequently dried at 80° C. Then, the electrode plate was pressed to make it show a porosity of 20%. After the press process, the electrode plate of the obtained negative electrode (hydrogen absorbing electrode) had a width of 48.5 mm, a length of 1,180 mm and a capacity of 11,000 mAh (11.0 Ah) and was provided with an active material-free zone having a width of 1.5 mm and extending along one of the long sides of the plate. The rate of filling hydrogen absorbing alloy powder of the negative electrode per 1 cm$^2$ was 0.07 g.

(Preparation of Sealed Nickel Metal-Hydride Battery)

Now, the process of preparing the sealed nickel metal-hydride battery of this example will be described below by referring to FIGS. 1 through 3.

(Fitting Upper Current Collecting Plate and Lower Current Collecting Plate to Rolled End of Electrode Assembly)

The negative electrode plate, a 120 μm-thick non-woven fabric separator of sulfonated polypropylene and a positive electrode plate were combined and wound to a roll to produce an electrode assembly 1 having a radius of 15.2 mm as shown in FIG. 1. A 0.3 mm-thick disk-shaped upper current collecting plate (positive electrode current collecting plate) 2 that was a nickel-plated steel plate having a radius of 14.5 mm and provided with a central through hole and eight slits 2-2, a pair of 0.5 mm-high brackets (parts to be engaged with the corresponding electrode substrate) being extending downward from the opposite edges of each of the slits, was bonded to the end of the positive electrode substrate projecting at one of the rolled ends (the upper rolled end in FIG. 1) of the electrode assembly 1 by resistance welding. A total of nine projections including a central projection and eight surrounding projections separated from the center by 9 mm were formed on a 0.3 mm-thick disk-shaped lower current collecting plate (negative electrode collecting plate) 3 that was a nickel-plated steel plate having a radius of 14.5 mm and provided with a central through hole and eight slits, a pair of 0.5 mm-high brackets (parts to be engaged with the corresponding electrode) being extending downward from the opposite edges of each of the slits. Then, the lower current collecting plate 3 was bonded to the end of the negative electrode substrate projecting at the other rolled end (the lower rolled end in FIG. 1) of the rolled electrode assembly 1. The central projection of the lower current collecting plate was made slightly lower than the other eight projections.

(Welding of Lower Current Collecting Plate and Bottom Inner Surface of Container)

A bottomed cylindrical container 4 made of nickel-plated steel plates was brought in and the electrode assembly 1, to which the upper current collecting plate 2 and the lower current collecting plate 3 had been fitted, was contained in the container 4 such that the upper current collecting plate 4 was located at the open end of the container 4 while the lower current collecting plate 3 was held in contact with the bottom of the container 4. Then, an aqueous electrolyte containing KOH by 6.8 mol/dm$^3$ and LiOH by 0.8 mol/dm$^3$ was injected by a predetermined quantity.

After the injection, the welding output terminals of a resistance welder were brought into contact respectively with the upper current collecting plate 2 and the bottom surface (negative electrode terminal) of the container 4 and electrically energized so as to show a same current value and a same energization period both in the charge direction and in the discharge direction. More specifically, the current value was set to be 0.6 kA/Ah (3.9 kA) per 1 Ah of the capacity (6.5 Ah) of the positive electrode plate while the energization period was set to be 4.5 msec both in the charge direction and in the discharge direction and 2 cycles of an AC pulse current was set to be applied. As a result of the application of an AC pulse current of a square wave, the lower surface of the lower current collecting plate 3 and the inner surface of the bottom of the container were welded to each other at the eight projections separated from the center of the negative electrode current collecting plate by 11 mm.

The ratio of the distance from the center of the lower current collecting plate 3 to the welded points P2 of the lower surface of the lower current collecting plate 3 and the inner surface of the bottom of the container 4 to the radius of the rolled electrode assembly 1 was 0.7. Subsequently, the electrode rod for resistance welding was pressed against the upper surface of the negative electrode current collecting plate and the outer surface of the bottom of the container in order to bring the projection at the center of the lower surface of the lower current collecting plate 3 into tight contact with the inner surface of the bottom of the container without flowing any electric current to the inside of the battery and the projection was welded to the inner surface of the bottom of the container by electric resistance welding.

(Preparation of Current Collecting Lead, Fitting to Lid and Sealing)

A current collecting lead having a ring-shaped main lead 8 and a supplementary lead 9 bonded to one of the long edges (the lower side of the main lead 8 in FIG. 2) as shown in FIG. 2 was used. The main lead 8 was made of a 0.8 mm-thick nickel plate with a width of 2.5 mm and a length of 66 mm and provided along one of the long sides thereof with sixteen 0.2 mm-high projections 11 also along the other long side thereof with sixteen 0.2 mm-high projections. The ring-shaped main lead 8 was produced by winding the nickel plate into a ring. (In FIG. 2, the supplementary lead 9 was fitted to the other long side (the lower long side) of the main lead 8 and the projections arranged along the other long side are not shown).

The supplementary lead 9 is made of a 0.3 mm-thick nickel plate and had a ring-shaped part having an outer diameter same as the main lead 8, eight jutted chips 9' projecting toward the inside of the ring-shaped part by 1 mm and projections 10 projecting from the front ends of the respective jutted chips 9'. As seen from FIG. 2, the jutted chips 9' of the supplementary lead 9 protrude downward from the ring-shaped part and operate as springs.

A sealing plate 0 made of a nickel-plated steel plate and having a circular central through hole of a diameter of 0.8 mm was prepared and the long side of the main lead 8 was brought into contact with the inner surface of the sealing plate 0. Then, the ring-shaped main lead 8 was welded to the inner surface of the sealing plate 0 by electric resistance welding. Subsequently, the ring-shaped part of the supplementary lead 9 was bonded to the other long side of the ring-shaped main lead 8 by electric resistance welding. A valve 7 and a cap 6 were fitted to the outer surface of the sealing plate 0 to produce a lid. A gasket 5 was fitted to the sealing plate 0 so as to surround the peripheral edge of the sealing plate 0. The lid had a radius of 14.5 mm and the cap had a radius of 6.5 mm, while the caulked radius of the gasket was 12.5 mm.

The lid to which the current collecting lead was fitted was then placed on the electrode assembly 1 such that the supplementary lead 9 was held in contact with the upper current collecting plate 2 and the open end of the container 4 was caulked to airtightly seal the battery. Then, the total height of the battery was adjusted by compressing it. Since the jutted chips 9' of the supplementary lead 9 operated as springs, the supplementary lead 9 and the upper current collecting plate 2 could be held in good contact with each other if the gap between the inner surface of the sealing plate 0 and the upper surface of the upper current collecting plate showed variances.

(Welding of Current Collecting Lead and Upper Current Collecting Plate)

One of the output terminal, or terminal A, of the electric resistance welder was held in contact with the lid (positive electrode terminal) while the other output terminal, or terminal B, of the electric resistance welder was held in contact with the bottom surface (negative electrode terminal) of the container 4 and the energization conditions were so set as to show a same current value and a same energization period both in the charge direction and in the discharge direction. More specifically, the current value was set to be 0.6 kA/Ah (3.9 kA) per 1 Ah of the capacity (6.5 Ah) of the positive electrode plate while the energization period was set to be 4.5 msec both in the charge direction and in the discharge direction and 2 cycles of an AC pulse current of square wave was set to be applied through the inside of the battery. At this time, it was confirmed that gas was not being generated to exceed the open valve pressure. The current collecting lead and the upper current collecting plate were welded to each other at eight welded points as described above to connect the lid and the positive electrode current collecting plate 2 by way of the current collecting lead and produce a sealed nickel metal-hydride battery as shown in FIG. 1.

The lid had a radius of 14.5 mm and the cap had a radius of 6.5 mm, while the caulked radius of the gasket was 12.5 mm. The ratio of the distance from the center of the upper current collecting plate 2 to the eight welded points P2 to the radius of the electrode assembly 1 was 0.6 in this example. The ratio of the shortest distance separating the welded points of the inner surface of the sealing plate and the current collecting lead and the current collecting lead and the upper current collecting plate to the gap between the inner surface of the sealing plate and the upper surface of the upper current collecting plate was about 1.4 in this example. Thus, according to the present invention, the current collecting lead and the upper current collecting plate are welded to each other after sealing the battery so that it is not necessary to provide the current collecting lead with a curvature unlike the prior art and hence the length of the current collecting lead connecting the welded points of the inner surface of the sealing plate and the current collecting lead and the welded points of the current collecting lead and the upper current collecting plate can be minimized. The weight of the battery of this example was 172 g. (Note that all the nickel metal-hydride batteries of Examples, Reference Examples and Comparative Examples that will be described hereinafter had a weight of 172 g.)

(Chemical Conversion)

After leaving the sealed battery at ambient temperature of 25° C. for 12 hours, the battery was charged at 130 mA (0.02 ItA) for 1,200 mAh and subsequently at 650 mA (0.1 ItA) for 10 hours before it was discharged at 1,300 mA (0.2 ItA) down to the cut voltage of 1 V. Thereafter, the battery was charged at 650 mA (0.1 ItA) for 16 hours before it was discharged at 1,300 mA (0.2 ItA) down to the cut voltage of 1.0 V and the charge/discharge cycle was repeated four times. Additionally, a cycle of charging the battery at 6.500 mA (1 ItA) at 45° C. until $-\Delta V$ shows fluctuations of 5 mV and discharging the battery at 6,500 mA (1 ItA) down to 1.0 V was repeated ten times.

(Measurement of Output Density)

The output density of the battery was measured in an atmosphere of 0° C. More specifically, the battery that had been subjected to chemical conversion was charged at 650 mA (0.1 ItA) in an atmosphere of 25° C. for 5 hours after the end of discharge and then left in an atmosphere of 0° C. for 4 hours. Subsequently, the battery was discharged with a discharge current of 30 A (which corresponds to 4.6 ItA) for 12 seconds and the voltage at the tenth second after the start of the discharge was defined as the 10th second voltage in a 30 A discharge operation. Then, the battery was charged with the quantity of electricity equal to the discharged quantity of electricity by means of a charge current of 6 A. Thereafter, the battery was discharged with a discharge current of 40 A (which corresponds to 6.2 ItA) for 12 seconds and the voltage at the tenth second after the start of the discharge was defined as the 10th second voltage in a 40 A discharge operation. Similarly, after the battery was charged with the quantity of electricity equal to the discharged quantity of electricity by means of a charge current of 6 A, the battery was discharged with a discharge current of 50 A (which corresponds to 7.7 ItA) for 12 seconds and the voltage at the tenth second after the start of the discharge was defined as the 10th second voltage in a 50 A discharge operation. Likewise, the battery was discharged with a discharge current of 60 A (which corresponds to 9.2 ItA) for 12 seconds and the voltage at the tenth second after the start of the discharge was defined as the 10th second voltage in a 60 A discharge operation. The 10th second voltages (measured values) were plotted relative to the discharge currents and linearly approximated by means of the method of least squares and the voltage value observed when the current value is extrapolated at 0 A was expressed as E0, while the inclination of the straight line was expressed as RDC. The value obtained by using E0, RDC and the battery weight as substitutes in the formula shown below was defined as output density at 0° C. when cut at 0.8 V.

$$\text{output density (W/kg)} = (E0-0.8) \div RDC \times 0.8/\text{battery weight (kg)}$$

(Charge/Discharge Cycle Test)

A charge/discharge cycle test was conducted in an atmosphere of 45° C. The battery that had been subjected to chemical conversion was left in an atmosphere of 45° C. for 4 hours. Then, the battery was charged at a charge rate of 0.5 ItA until $-\Delta V$ shows fluctuations of 5 mV and discharged at a discharge rate of 0.5 ItA down to the discharge cut voltage of 1.0 V. The above charge/discharge cycle was repeated and the number of cycles observed when the discharge capacity became short of 80% of the discharge capacity of the first cycle of the charge/discharge cycle test was defined as cycle life.

Example 2

A nickel metal-hydride battery having a structure similar to the nickel metal-hydride battery of Example 1 was prepared except that the hydrogen absorbing alloy powder B (with saturation mass susceptibility of 2 emu/g) whose duration of immersion in the surface reforming process differed from the hydrogen absorbing alloy powder C was used. Then, a charge/discharge cycle test was conducted as in Example 1 and the output density was observed. This example is referred to as Example 2.

Example 3

A nickel metal-hydride battery having a structure similar to the nickel metal-hydride battery of Example 1 was prepared except that the hydrogen absorbing alloy powder D (with a saturation mass susceptibility of 6 emu/g) whose duration of immersion in the surface reforming process differed from the hydrogen absorbing alloy powder C was used. Then, a charge/discharge cycle test was conducted as in Example 1 and the output density was observed. This example is referred to as Example 3.

Comparative Example 1

A nickel metal-hydride battery having a structure similar to the nickel metal-hydride battery of Example 1 was prepared except that the hydrogen absorbing alloy powder A (with a saturation mass susceptibility of 0.06 emu/g) that had not been subjected to a surface reforming process was used. Then, a charge/discharge cycle test was conducted as in Example 1 and the output density was observed. This example is referred to as Comparative Example 1.

Comparative Example 2

A nickel metal-hydride battery having a structure similar to the nickel metal-hydride battery of Example 1 was prepared except that the hydrogen absorbing alloy powder E (with a saturation mass susceptibility of 8 emu/g) whose duration of immersion in the surface reforming process differed from the hydrogen absorbing alloy powder C was used. Then, a charge/discharge cycle test was conducted as in Example 1 and the output density was observed. This example is referred to as Comparative Example 2.

Table 2 below summarily shows the results of the tests on Examples 1 through 3 and Comparative Examples 1 and 2.

TABLE 2

| | hydrogen absorbing electrode | | | | |
|---|---|---|---|---|---|
| | hydrogen absorbing alloy powder saturation | | single electrode test | battery performance | |
| classification | mass susceptibility (emu/g) | filling rate (g/cm$^2$) | reaction resistance (mΩ) | output density (W/kg) | cycle life (cycles) |
| Example 1 | 4 | 0.07 | 210 | 667 | 560 |
| Example 2 | 2 | 0.07 | 250 | 500 | 581 |
| Example 3 | 6 | 0.07 | 200 | 722 | 525 |
| Comp. Example 1 | 0.06 | 0.07 | 620 | 167 | 283 |
| Comp. Example 2 | 8 | 0.07 | 185 | 789 | 289 |

Figure 7:
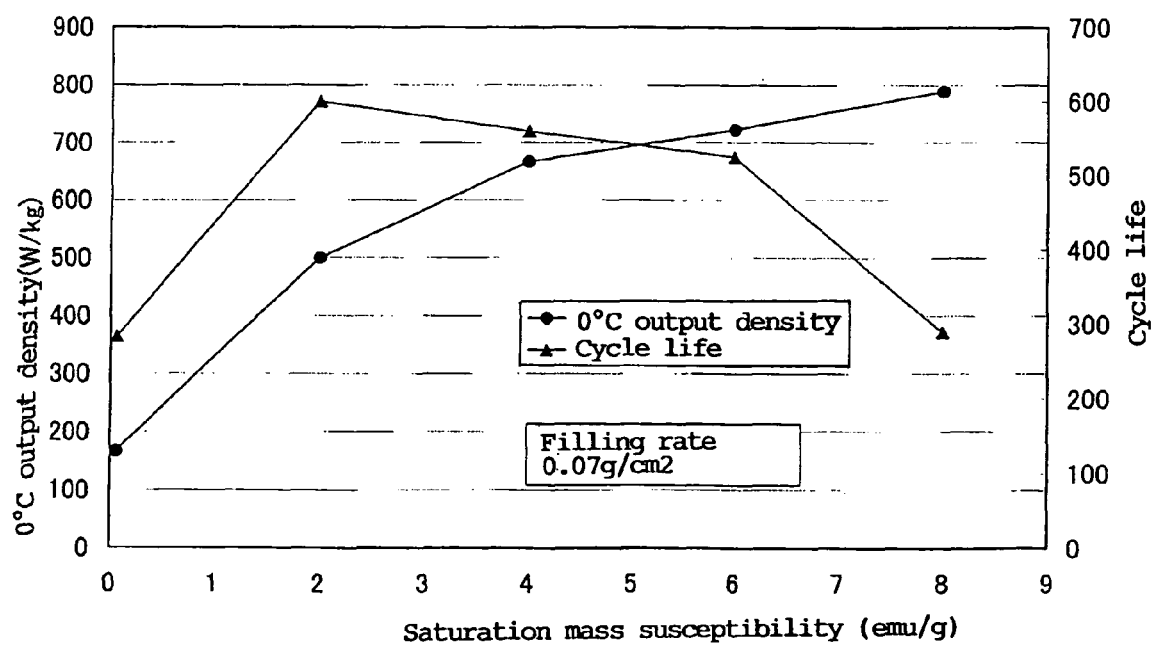
FIG. 7 is a graph illustrating the relationship among the output density at 0° C., the cycle life and the saturation mass susceptibility of the hydrogen absorbing alloy powder of a nickel metal-hydride battery according to the present invention.

As shown in Table 2 and FIG. 7, a battery realized by using a hydrogen absorbing electrode showing a reaction resistance in a single electrode test showed a high output at 0° C. and it was found that the reaction resistance and the output power performance of the battery are correlated. The results illustrated in FIG. 6, Table 2 and FIG. 7 indicate that a high output power performance can be achieved by making the saturation mass susceptibility of hydrogen absorbing alloy powder not less than 2 emu/g and the filling rate thereof not more than 0.15 g/cm$^2$.

However, it was found that the cycle performance of the battery falls as the saturation mass susceptibility of the hydrogen absorbing alloy powder used in the battery rises and that the cycle life becomes remarkably short when the saturation mass susceptibility is 8 emu/g. It may be safe to assume that this is because a corrosion layer is formed in the surface layer by an alkaline immersion treatment and the mother phase of the alloy is reduced as the saturation mass susceptibility rises so that the real capacity of the hydrogen absorbing electrode becomes smaller than the computed capacity to reduce the charge that can be reserved. It was also found that a battery realized by using a hydrogen absorbing electrode showing a saturation mass susceptibility of 0.6 emu/g has a poor cycle life probably because the ratio of utilization of hydrogen absorbing alloy is low and an overcharge can easily take place.

From the results shown in Table 2, it could be expected that a battery shows a good cycle performance when the saturation mass susceptibility of the hydrogen absorbing alloy powder used in the battery is between 2 and 6 emu/g. Additionally, since the output density and the inclination of the cycle performance curve rises relative to the saturation mass susceptibility when the saturation mass susceptibility is less than 2 emu/g as shown in FIG. 7, it can be expected that the output density and the cycle performance fall remarkably when the saturation mass susceptibility is slightly shifted downwardly. The zones where the inclination of the cycle performance is large is not suited for mass production because it is difficult to stably secure a good product quality in such zones.

(Correlation of Rate of Filling Hydrogen Absorbing Alloy Powder and Battery Performance)

(Examples Using Hydrogen Absorbing Alloy Powder Showing a Saturation Mass Susceptibility of 2 emu/g)

Example 4

The rate of filling hydrogen absorbing alloy powder into the negative electrode plate per unit area was made equal to 0.06 g/cm$^2$ in Example 2. Additionally, when preparing the battery, the lengths of both the positive electrode plate and the negative electrode plate and the thickness of the positive electrode plate were adjusted until the insertion ratio of the electrode assembly of the positive electrode plate and the negative electrode plate into the container remained same, while making the capacity of the battery and hence the positive electrode equal to 6,500 mAh and maintaining the relationship of the length of the positive electrode plate=the length of the negative electrode plate−80 (mm). The length of the negative electrode plate of the prepared battery was 1,260 mm and the capacity of the negative electrode plate computed from the rate of filling hydrogen absorbing alloy powder was 10,000 mAh. A nickel metal-hydride battery otherwise having a structure same as that of Example 2 was prepared and subjected to a charge/discharge cycle test and the output density thereof was measured. This example is referred to as Example 4.

Example 5

The rate of filling hydrogen absorbing alloy powder into the negative electrode plate per unit area was made equal to 0.09 g/cm$^2$ in Example 2. Additionally, when preparing the battery, the lengths of both the positive electrode plate and the negative electrode plate and the thickness of the positive electrode plate were adjusted until the insertion ratio of the electrode assembly of the positive electrode plate and the negative electrode plate into the container remained the same, while making the capacity of the battery and hence the positive electrode equal to 6,500 mAh and maintaining the relationship of the length of the positive electrode plate=the length of the negative electrode plate−80 (mm). The length of the negative electrode plate of the prepared battery was 1,080 mm and the capacity of the negative electrode plate computed from the rate of filling hydrogen absorbing alloy powder was 12,900 mAh. A nickel metal-hydride battery otherwise having a structure same as that of Example 2 was prepared and subjected to a charge/discharge cycle test and the output density thereof was measured. This example is referred to as Example 5.

Example 6

The rate of filling hydrogen absorbing alloy powder into the negative electrode plate per unit area was made equal to 0.15 g/cm$^2$ in Example 2. Additionally, when preparing the battery, the lengths of both the positive electrode plate and the negative electrode plate and the thickness of the positive electrode plate were adjusted until the insertion ratio of the electrode assembly of the positive electrode plate and the negative electrode plate into the container remained the same, while making the capacity of the battery and hence the positive electrode equal to 6,500 mAh and maintaining the relationship of the length of the positive electrode plate=the length of the negative electrode plate−80 (mm). The length of the negative electrode plate of the prepared battery was 810 mm and the capacity of the negative electrode plate computed from the rate of filling hydrogen absorbing alloy powder was 16,900 mAh. A nickel metal-hydride battery otherwise having a structure same as that of Example 2 was prepared and subjected to a charge/discharge cycle test and the output density thereof was measured. This example is referred to as Example 6.

Comparative Example 3

The rate of filling hydrogen absorbing alloy powder into the negative electrode plate per unit area was made equal to 0.04 g/cm² in Example 2. Additionally, when preparing the battery, the lengths of both the positive electrode plate and the negative electrode plate and the thickness of the positive electrode plate were adjusted until the insertion ratio of the electrode assembly of the positive electrode plate and the negative electrode plate into the container remained the same, while making the capacity of the battery and hence the positive electrode equal to 6,500 mAh and maintaining the relationship of the length of the positive electrode plate=the length of the negative electrode plate−80 (mm). The length of the negative electrode plate of the prepared battery was 1,350 mm and the capacity of the negative electrode plate computed from the rate of filling hydrogen absorbing alloy powder was 7,200 mAh. A nickel metal-hydride battery otherwise having a structure same as that of Example 2 was prepared and subjected to a charge/discharge cycle test and the output density thereof was measured. This example is referred to as Comparative Example 3.

Comparative Example 4

The rate of filling hydrogen absorbing alloy powder into the negative electrode plate per unit area was made equal to 0.18 g/cm² in Example 2. Additionally, when preparing the battery, the lengths of both the positive electrode plate and the negative electrode plate and the thickness of the positive electrode plate were adjusted until the insertion ratio of the electrode assembly of the positive electrode plate and the negative electrode plate into the container remained the same, while making the capacity of the battery and hence the positive electrode equal to 6,500 mAh and maintaining the relationship of the length of the positive electrode plate=the length of the negative electrode plate−80 (mm). The length of the negative electrode plate of the prepared battery was 750 mm and the capacity of the negative electrode plate computed from the rate of filling hydrogen absorbing alloy powder was 17,900 mAh. A nickel metal-hydride battery otherwise having a structure same as that of Example 2 was prepared and subjected to a charge/discharge cycle test and the output density thereof was measured. This example is referred to as Comparative Example 4.

Table 3 below summarily shows the results of the tests on Examples 4 through 6 and Comparative Examples 3 and 4 along with the results of the tests on Example 2 and Comparative Example 1.

TABLE 3

| classification | hydrogen absorbing electrode | | battery characteristics | |
|---|---|---|---|---|
| | saturation mass susceptibility (emu/g) | filling rate (g/cm²) | output density (W/kg) | cycle life (cycles) |
| Comp. Ex. 3 | 2 | 0.04 | 510 | 90 |
| Example 4 | 2 | 0.06 | 506 | 435 |
| Example 2 | 2 | 0.07 | 500 | 581 |
| Example 5 | 2 | 0.09 | 490 | 632 |
| Example 6 | 2 | 0.15 | 431 | 730 |
| Comp. Ex. 4 | 2 | 0.18 | 254 | 805 |
| Comp. Ex. 1 | 0.06 | 0.07 | 167 | 283 |

When hydrogen absorbing alloy powder showing a saturation mass susceptibility of 2 emu/g was used, the output density gradually falls as the filling rate increases within a range of not more than 0.15 g/cm³. However, the output density remarkably falls when the filling rate is raised from 0.15 g/cm³ to 0.18 g/cm³ of the status quo. This means that the reaction resistance of the negative electrode remarkably increases when the filling rate is raised from 0.15 g/cm³ to 0.18 g/cm³. On the other hand, the cycle performance is gradually degraded as the filling rate is reduced in a range of filling rate not less than 0.06 g/cm³ but is remarkably degraded when the filling rate is reduced to 0.04 g/cm³. It may be safe to assume that this is because it is difficult to secure a sufficient charge reserve when the filling rate is reduced to 0.04 g/cm³.

On the other hand, when hydrogen absorbing alloy powder showing a saturation mass susceptibility of 0.06 emu/g was used, the output density was low even if the filling rate was set to be as low as 0.07 g/cm³. From the results shown in Table 3, it was found that a nickel metal-hydride battery showing an excellent output density and an excellent cycle performance can be obtained by selecting a filling rate between 0.06 g/cm³ and 0.15 g/cm³.

Within the above cited range, it is preferable to select a filling rate that is not less than 0.07 g/cm³ because the cycle life exceeds 500 cycles with such a filling rate and it is more preferable to select a filling rate not less than 0.09 g/cm³ because the cycle life exceeds 600 cycles with such a filling rate.

(Examples Using Hydrogen Absorbing Alloy Powder Showing Saturation Mass Susceptibility of 4 emu/g)

Example 7

The rate of filling hydrogen absorbing alloy powder into the negative electrode plate per unit area was made equal to 0.06 g/cm² in Example 1. Additionally, when preparing the battery, the lengths of both the positive electrode plate and the negative electrode plate and the thickness of the positive electrode plate were adjusted until the insertion ratio of the electrode assembly of the positive electrode plate and the negative electrode plate into the container remained the same, while making the capacity of the battery and hence the positive electrode equal to 6,500 mAh and maintaining the relationship of the length of the positive electrode plate=the length of the negative electrode plate−80 (mm). The length of the negative electrode plate of the prepared battery was 1,260 mm and the capacity of the negative electrode plate computed from the rate of filling hydrogen absorbing alloy powder was 10,000 mAh. A nickel metal-hydride battery otherwise having a structure same as that of Example 1 was prepared and subjected to a charge/discharge cycle test and the output density thereof was measured. This example is referred to as Example 7.

Example 8

The rate of filling hydrogen absorbing alloy powder into the negative electrode plate per unit area was made equal to 0.09 g/cm² in Example 1. Additionally, when preparing the battery, the lengths of both the positive electrode plate and the negative electrode plate and the thickness of the positive electrode plate were adjusted until the insertion ratio of the electrode assembly of the positive electrode plate and the negative electrode plate into the container remained the same, while making the capacity of the battery and hence the positive electrode equal to 6,500 mAh and maintaining the relationship of the length of the positive electrode plate=the length of the negative electrode plate−80 (mm). The length of the negative electrode plate of the prepared battery was 1,080 mm and the capacity of the negative electrode plate computed from the rate of filling hydrogen absorbing alloy powder was 12,900 mAh. A nickel metal-hydride battery otherwise having a structure same as that of Example 1 was prepared and subjected to a charge/discharge cycle test and the output density thereof was measured. This example is referred to as Example 8.

Example 9

The rate of filling hydrogen absorbing alloy powder into the negative electrode plate per unit area was made equal to 0.15 g/cm$^2$ in Example 1. Additionally, when preparing the battery, the lengths of both the positive electrode plate and the negative electrode plate and the thickness of the positive electrode plate were adjusted until the insertion ratio of the electrode assembly of the positive electrode plate and the negative electrode plate into the container remained the same, while making the capacity of the battery and hence the positive electrode equal to 6,500 mAh and maintaining the relationship of the length of the positive electrode plate=the length of the negative electrode plate−80 (mm). The length of the negative electrode plate of the prepared battery was 810 mm and the capacity of the negative electrode plate computed from the rate of filling hydrogen absorbing alloy powder was 16,900 mAh. A nickel metal-hydride battery otherwise having a structure same as that of Example 1 was prepared and subjected to a charge/discharge cycle test and the output density thereof was measured. This example is referred to as Example 9.

Comparative Example 5

The rate of filling hydrogen absorbing alloy powder into the negative electrode plate per unit area was made equal to 0.04 g/cm$^2$ in Example 1. Additionally, when preparing the battery, the lengths of both the positive electrode plate and the negative electrode plate and the thickness of the positive electrode plate were adjusted until the insertion ratio of the electrode assembly of the positive electrode plate and the negative electrode plate into the container remained the same, while making the capacity of the battery and hence the positive electrode equal to 6,500 mAh and maintaining the relationship of the length of the positive electrode plate=the length of the negative electrode plate−80 (mm). The length of the negative electrode plate of the prepared battery was 1,350 mm and the capacity of the negative electrode plate computed from the rate of filling hydrogen absorbing alloy powder was 7,200 mAh. A nickel metal-hydride battery otherwise having a structure same as that of Example 1 was prepared and subjected to a charge/discharge cycle test and the output density thereof was measured. This example is referred to as Comparative Example 5.

Comparative Example 6

The rate of filling hydrogen absorbing alloy powder into the negative electrode plate per unit area was made equal to 0.18 g/cm$^2$ in Example 1. Additionally, when preparing the battery, the lengths of both the positive electrode plate and the negative electrode plate and the thickness of the positive electrode plate were adjusted until the insertion ratio of the electrode assembly of the positive electrode plate and the negative electrode plate into the container remained the same, while making the capacity of the battery and hence the positive electrode equal to 6,500 mAh and maintaining the relationship of the length of the positive electrode plate=the length of the negative electrode plate−80 (mm). The length of the negative electrode plate of the prepared battery was 750 mm and the capacity of the negative electrode plate computed from the rate of filling hydrogen absorbing alloy powder was 17,900 mAh. A nickel metal-hydride battery otherwise having a structure same as that of Example 1 was prepared and subjected to a charge/discharge cycle test and the output density thereof was measured. This example is referred to as Comparative Example 6.

Comparative Example 7

The rate of filling hydrogen absorbing alloy powder into the negative electrode plate per unit area was made equal to 0.20 g/cm$^2$ in Example 1. Additionally, when preparing the battery, the lengths of both the positive electrode plate and the negative electrode plate and the thickness of the positive electrode plate were adjusted until the insertion ratio of the electrode assembly of the positive electrode plate and the negative electrode plate into the container remained the same, while making the capacity of the battery and hence the positive electrode equal to 6,500 mAh and maintaining the relationship of the length of the positive electrode plate=the length of the negative electrode plate−80 (mm). The length of the negative electrode plate of the prepared battery was 710 mm and the capacity of the negative electrode plate computed from the rate of filling hydrogen absorbing alloy powder was 18,850 mAh. A nickel metal-hydride battery otherwise having a structure same as that of Example 1 was prepared and the output density thereof was measured. (The nickel metal-hydride battery was not subjected to a charge/discharge cycle test because the output density was poor.) This example is referred to as Comparative Example 7.

Table 4 below and FIG. 8 summarily show the results of the tests on Examples 7 through 9 and Comparative Examples 5 through 7 along with the results of the tests on Example 1.

TABLE 4

| | hydrogen absorbing electrode | | battery characteristics | |
|---|---|---|---|---|
| | saturation mass | | | |
| classification | susceptibility (emu/g) | filling rate (g/cm$^2$) | output density (W/kg) | cycle life (cycles) |
| Comp. Ex. 5 | 4 | 0.04 | 693 | 80 |
| Example 7 | 4 | 0.06 | 680 | 420 |
| Example 1 | 4 | 0.07 | 667 | 560 |
| Example 8 | 4 | 0.09 | 636 | 610 |
| Example 9 | 4 | 0.15 | 556 | 720 |
| Comp. Ex. 6 | 4 | 0.18 | 335 | 800 |
| Comp. Ex. 7 | 4 | 0.20 | 206 | — |

Figure 8:
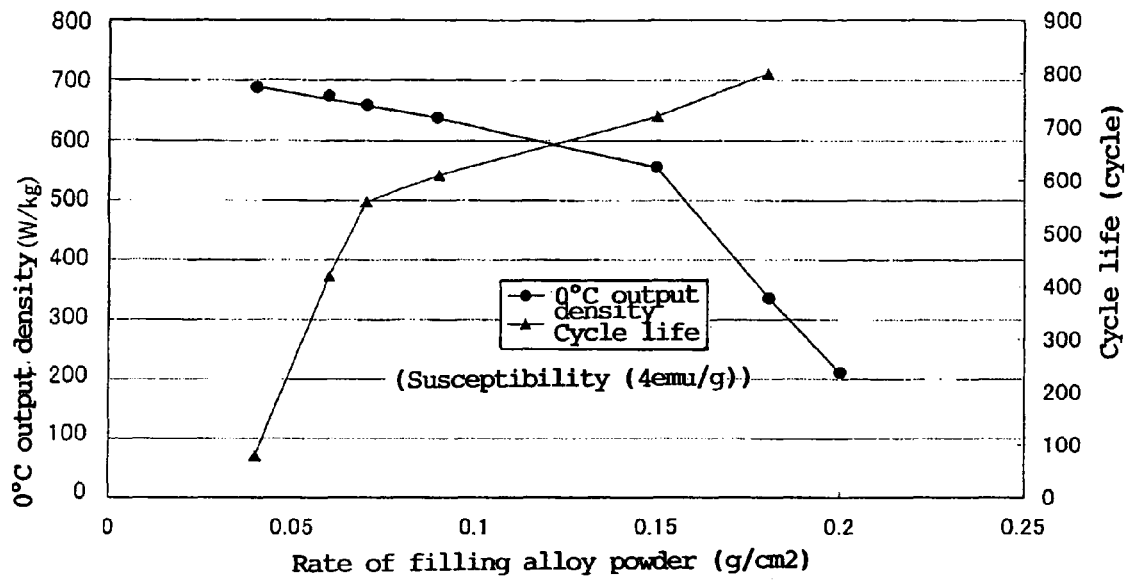
FIG. 8 is a graph illustrating the relationship among the output density at 0° C., the cycle life and the amount per unit area of the filled hydrogen absorbing alloy powder of a nickel metal-hydride battery according to the present invention.

From the results shown in Table 4 and FIG. 8, it will be seen that, when hydrogen absorbing alloy powder showing a saturation mass susceptibility of 4 emu/g was used, the output density gradually falls as the filling rate increases within a range of not more than 0.15 g/cm$^3$. However, the output density remarkably falls when the filling rate is raised from 0.15 g/cm$^3$ to 0.18 g/cm$^3$ of the status quo as in the case of using hydrogen absorbing alloy powder showing a saturation mass susceptibility of 2 emu/g. On the other hand, the cycle performance is gradually degraded as the filling rate is reduced in a range of filling rate not less than 0.06 g/cm$^3$ but is remarkably degraded when the filling rate is reduced to 0.04 g/cm$^3$. From the results shown in Table 4 and FIG. 8, it was found that a nickel metal-hydride battery showing an excellent output density and an excellent cycle performance can be obtained by selecting a filling rate between 0.06 g/cm$^3$ and 0.15 g/cm$^3$. Within the above cited range, it is preferable to select a filling rate that is not less than 0.07 g/cm³ because the cycle life exceeds 500 cycles with such a filling rate and it is more preferable to select a filling rate not less than 0.09 g/cm³ because the cycle life exceeds 600 cycles with such a filling rate.

(Examples Using Hydrogen Absorbing Alloy Powder Showing Saturation Mass Susceptibility of 6 emu/g)

Example 10

The rate of filling hydrogen absorbing alloy powder into the negative electrode plate per unit area was made equal to 0.06 g/cm² in Example 3. Additionally, when preparing the battery, the lengths of both the positive electrode plate and the negative electrode plate and the thickness of the positive electrode plate were adjusted until the insertion ratio of the electrode assembly of the positive electrode plate and the negative electrode plate into the container remained the same, while making the capacity of the battery and hence the positive electrode equal to 6,500 mAh and maintaining the relationship of the length of the positive electrode plate=the length of the negative electrode plate−80 (mm). The length of the negative electrode plate of the prepared battery was 1,260 mm and the capacity of the negative electrode plate computed from the rate of filling hydrogen absorbing alloy powder was 10,000 mAh. A nickel metal-hydride battery otherwise having a structure same as that of Example 3 was prepared and subjected to a charge/discharge cycle test and the output density thereof was measured. This example is referred to as Example 10.

Example 11

The rate of filling hydrogen absorbing alloy powder into the negative electrode plate per unit area was made equal to 0.09 g/cm² in Example 3. Additionally, when preparing the battery, the lengths of both the positive electrode plate and the negative electrode plate and the thickness of the positive electrode plate were adjusted until the insertion ratio of the electrode assembly of the positive electrode plate and the negative electrode plate into the container remained the same, while making the capacity of the battery and hence the positive electrode equal to 6,500 mAh and maintaining the relationship of the length of the positive electrode plate=the length of the negative electrode plate−80 (mm). The length of the negative electrode plate of the prepared battery was 1,080 mm and the capacity of the negative electrode plate computed from the rate of filling hydrogen absorbing alloy powder was 12,900 mAh. A nickel metal-hydride battery otherwise having a structure same as that of Example 3 was prepared and subjected to a charge/discharge cycle test and the output density thereof was measured. This example is referred to as Example 11.

Example 12

The rate of filling hydrogen absorbing alloy powder into the negative electrode plate per unit area was made equal to 0.15 g/cm² in Example 3. Additionally, when preparing the battery, the lengths of both the positive electrode plate and the negative electrode plate and the thickness of the positive electrode plate were adjusted until the insertion ratio of the electrode assembly of the positive electrode plate and the negative electrode plate into the container remained the same, while making the capacity of the battery and hence the positive electrode equal to 6,500 mAh and maintaining the relationship of the length of the positive electrode plate=the length of the negative electrode plate−80 (mm). The length of the negative electrode plate of the prepared battery was 810 mm and the capacity of the negative electrode plate computed from the rate of filling hydrogen absorbing alloy powder was 16,900 mAh. A nickel metal-hydride battery otherwise having a structure same as that of Example 3 was prepared and subjected to a charge/discharge cycle test and the output density thereof was measured. This example is referred to as Example 12.

Comparative Example 8

The rate of filling hydrogen absorbing alloy powder into the negative electrode plate per unit area was made equal to 0.04 g/cm² in Example 3. Additionally, when preparing the battery, the lengths of both the positive electrode plate and the negative electrode plate and the thickness of the positive electrode plate were adjusted until the insertion ratio of the electrode assembly of the positive electrode plate and the negative electrode plate into the container remained the same, while making the capacity of the battery and hence the positive electrode equal to 6,500 mAh and maintaining the relationship of the length of the positive electrode plate=the length of the negative electrode plate−80 (mm). The length of the negative electrode plate of the prepared battery was 1,350 mm and the capacity of the negative electrode plate computed from the rate of filling hydrogen absorbing alloy powder was 7,200 mAh. A nickel metal-hydride battery otherwise having a structure same as that of Example 3 was prepared and subjected to a charge/discharge cycle test and the output density thereof was measured. This example is referred to as Comparative Example 8.

Comparative Example 9

The rate of filling hydrogen absorbing alloy powder into the negative electrode plate per unit area was made equal to 0.18 g/cm² in Example 3. Additionally, when preparing the battery, the lengths of both the positive electrode plate and the negative electrode plate and the thickness of the positive electrode plate were adjusted until the insertion ratio of the electrode assembly of the positive electrode plate and the negative electrode plate into the container remained the same, while making the capacity of the battery and hence the positive electrode equal to 6,500 mAh and maintaining the relationship of the length of the positive electrode plate=the length of the negative electrode plate−80 (mm). The length of the negative electrode plate of the prepared battery was 750 mm and the capacity of the negative electrode plate computed from the rate of filling hydrogen absorbing alloy powder was 17,900 mAh. A nickel metal-hydride battery otherwise having a structure same as that of Example 3 was prepared and subjected to a charge/discharge cycle test and the output density thereof was measured. This example is referred to as Comparative Example 9.

(Examples Using Hydrogen Absorbing Alloy Powder Showing Saturation Mass Susceptibility of 8 emu/g)

Comparative Example 10

The rate of filling hydrogen absorbing alloy powder into the negative electrode plate per unit area was made equal to 0.15 g/cm² in Comparative Example 2. Additionally, when preparing the battery, the lengths of both the positive electrode plate and the negative electrode plate and the thickness of the positive electrode plate were adjusted until the insertion ratio of the electrode assembly of the positive electrode plate and the negative electrode plate into the container remained the same, while making the capacity of the battery and hence the positive electrode equal to 6,500 mAh and maintaining the relationship of the length of the positive electrode plate=the length of the negative electrode plate−80 (mm). The length of the negative electrode plate of the prepared battery was 810 mm and the capacity of the negative electrode plate computed from the rate of filling hydrogen absorbing alloy powder was 16,900 mAh. A nickel metal-hydride battery otherwise having a structure same as that of Comparative Example 2 was prepared and subjected to a charge/discharge cycle test and the output density thereof was measured. This example is referred to as Comparative Example 10.

Comparative Example 11

The rate of filling hydrogen absorbing alloy powder into the negative electrode plate per unit area was made equal to 0.18 g/cm² in Comparative Example 2. Additionally, when preparing the battery, the lengths of both the positive electrode plate and the negative electrode plate and the thickness of the positive electrode plate were adjusted until the insertion ratio of the electrode assembly of the positive electrode plate and the negative electrode plate into the container remained the same, while making the capacity of the battery and hence the positive electrode equal to 6,500 mAh and maintaining the relationship of the length of the positive electrode plate=the length of the negative electrode plate−80 (mm). The length of the negative electrode plate of the prepared battery was 750 mm and the capacity of the negative electrode plate computed from the rate of filling hydrogen absorbing alloy powder was 17,900 mAh. A nickel metal-hydride battery otherwise having a structure same as that of Comparative Example 2 was prepared and subjected to a charge/discharge cycle test and the output density thereof was measured. This example is referred to as Comparative Example 11.

Comparative Example 12

The rate of filling hydrogen absorbing alloy powder into the negative electrode plate per unit area was made equal to 0.20 g/cm² in Comparative Example 2. Additionally, when preparing the battery, the lengths of both the positive electrode plate and the negative electrode plate and the thickness of the positive electrode plate were adjusted until the insertion ratio of the electrode assembly of the positive electrode plate and the negative electrode plate into the container remained the same, while making the capacity of the battery and hence the positive electrode equal to 6,500 mAh and maintaining the relationship of the length of the positive electrode plate=the length of the negative electrode plate−80 (mm). The length of the negative electrode plate of the prepared battery was 710 mm and the capacity of the negative electrode plate computed from the rate of filling hydrogen absorbing alloy powder was 18,850 mAh. A nickel metal-hydride battery otherwise having a structure same as that of Comparative Example 2 was prepared and the output density thereof was measured. (The nickel metal-hydride battery was not subjected to a charge/discharge cycle test because the output density was poor.) This example is referred to as Comparative Example 12.

Table 5 below summarily shows the results of the tests on Examples 10 through 12 and Comparative Examples 8 through 12 along with the results of the tests on Example 3.

TABLE 5

| | hydrogen absorbing electrode | | battery characteristics | |
|---|---|---|---|---|
| classification | saturation mass susceptibility (emu/g) | filling rate (g/cm²) | output density (W/kg) | cycle life (cycles) |
| Comp. Ex. 8 | 6 | 0.04 | 733 | 60 |
| Example 10 | 6 | 0.06 | 730 | 410 |
| Example 3 | 6 | 0.07 | 722 | 525 |
| Example 11 | 6 | 0.09 | 688 | 560 |
| Example 12 | 6 | 0.15 | 594 | 603 |
| Comp. Ex. 9 | 6 | 0.18 | 359 | 621 |
| Comp. Ex. 10 | 8 | 0.09 | 764 | 314 |
| Comp. Ex. 11 | 8 | 0.15 | 654 | 355 |
| Comp. Ex. 12 | 8 | 0.18 | 394 | 382 |

When hydrogen absorbing alloy powder showing a saturation mass susceptibility of 6 emu/g was used, the output density gradually falls as the filling rate increases within a range of not more than 0.15 g/cm³. However, the output density remarkably falls when the filling rate is raised from 0.15 g/cm³ to 0.18 g/cm³ of the status quo as in the case of using hydrogen absorbing alloy powder showing a saturation mass susceptibility of 2 emu/g or hydrogen absorbing alloy powder showing a saturation mass susceptibility of 4 emu/g. On the other hand, the cycle performance is gradually degraded as the filling rate is reduced in a range of filling rate not less than 0.06 g/cm³ but is remarkably degraded when the filling rate is reduced to 0.04 g/cm³. From the results shown in Table 5, it was found that a nickel metal-hydride battery showing an excellent output density and an excellent cycle performance can be obtained by using hydrogen absorbing alloy powder showing a saturation mass susceptibility of 6 emu/g and selecting a filling rate between 0.06 g/cm³ and 0.15 g/cm³. Within the above cited range, it is preferable to select a filling rate that is not less than 0.07 g/cm³ because the cycle life exceeds 500 cycles with such a filling rate and it is more preferable to select a filling rate not less than 0.09 g/cm³ because the cycle life exceeds 550 cycles with such a filling rate.

No feasible cycle performance can be obtained when hydrogen absorbing alloy powder showing a saturation mass susceptibility of 8 emu/g was used. When the filling rate was raised to the level of the status quo of 0.18 g/cm³, the cycle life was short of 400 cycles and the output density was short of 400 W/kg.

From the above-described results, it was found that the reaction resistance of hydrogen absorbing alloy powder can be reduced when a value between 2 emu/g and 6 emu/g is selected for the saturation mass susceptibility of the hydrogen absorbing alloy powder electrode and a value between 0.06 g/cm² and 0.15 g/cm² is selected for the rate of filling hydrogen absorbing alloy powder and a sealed nickel metal-hydride battery showing a high output and an excellent cycle performance can be obtained by using hydrogen absorbing alloy powder having the above cited values. A particularly excellent cycle performance can be obtained when the filling rate is not less than 0.07 g/cm², and more preferably not less than 0.9 g/cm².

(Relationship Between Average Particle Size of Hydrogen Absorbing Alloy Powder and Battery Characteristics)

Example 13

A nickel metal-hydride battery having a structure similar to the nickel metal-hydride battery of Example 1 was prepared except that an average particle size of 10 μm was selected for the hydrogen absorbing alloy powder of the negative electrode and subjected to a charge/discharge cycle test and an operation of measuring the output density thereof as in Example 1. This example is referred to as Example 13.

Example 14

A nickel metal-hydride battery having a structure similar to the nickel metal-hydride battery of Example 1 was prepared except that an average particle size of 28 μm was selected for the hydrogen absorbing alloy powder of the negative electrode and subjected to a charge/discharge cycle test and an operation of measuring the output density thereof as in Example 1. This example is referred to as Example 14.

Example 15

A nickel metal-hydride battery having a structure similar to the nickel metal-hydride battery of Example 1 was prepared except that an average particle size of 35 μm was selected for the hydrogen absorbing alloy powder of the negative electrode and subjected to a charge/discharge cycle test and an operation of measuring the output density thereof as in Example 1. This example is referred to as Example 15.

Reference Example 1

A nickel metal-hydride battery having a structure similar to the nickel metal-hydride battery of Example 1 was prepared except that an average particle size of 5 μm was selected for the hydrogen absorbing alloy powder of the negative electrode and subjected to a charge/discharge cycle test and an operation of measuring the output density thereof as in Example 1. This example is referred to as Reference Example 1.

Reference Example 2

A nickel metal-hydride battery having a structure similar to the nickel metal-hydride battery of Example 1 was prepared except that an average particle size of 50 μm was selected for the hydrogen absorbing alloy powder of the negative electrode and subjected to a charge/discharge cycle test and an operation of measuring the output density thereof as in Example 1. This example is referred to as Reference Example 2.

Table 6 below summarily shows the results of the tests on Examples 13 through 15 and Reference Examples 1 and 2 along with the results of the tests on Example 1.

TABLE 6

| classification | hydrogen absorbing alloy powder | | | battery characteristics | |
|---|---|---|---|---|---|
| | average particle size (μm) | saturation mass susceptibility (emu/g) | filling rate (g/cm²) | output density (W/kg) | cycle life (cycles) |
| Example 1 | 20 | 4 | 0.07 | 667 | 560 |
| Example 13 | 10 | 4 | 0.07 | 737 | 430 |
| Example 14 | 28 | 4 | 0.07 | 633 | 583 |
| Example 15 | 35 | 4 | 0.07 | 519 | 580 |
| Ref. Ex. 1 | 5 | 4 | 0.07 | 769 | 120 |
| Ref. Ex. 2 | 50 | 4 | 0.07 | 226 | 505 |

Figure 9:
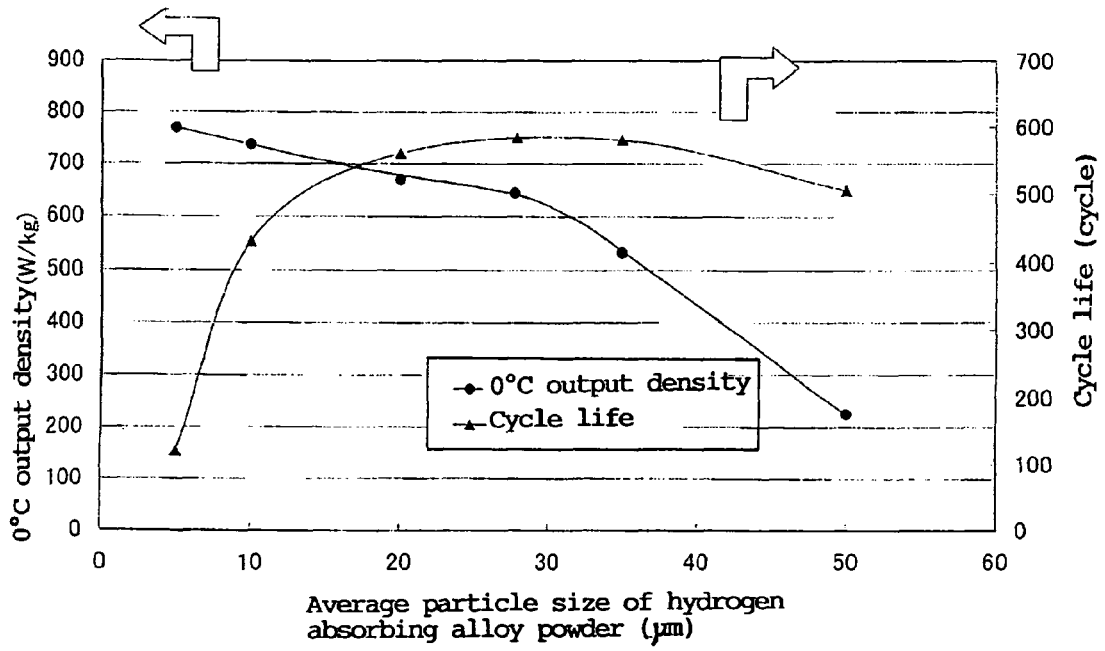
FIG. 9 is a graph illustrating the relationship among the output density at 0° C., the cycle life and the average particle size of the hydrogen absorbing alloy powder of a nickel metal-hydride battery according to the present invention.

As seen from Table 6 and FIG. 9, a nickel metal-hydride battery showed high output power performance when the average particle size of the hydrogen absorbing alloy powder thereof was small. However, the cycle life performance of a battery dramatically fell when the average particle size was 5 μm. Additionally, the output density at 0° C. remarkable fell when the average particle size was 28 μm, 35 μm or higher and the output power performance was remarkably degraded when the average particle size was 50 μm. This may means that, while the surface area of the hydrogen absorbing alloy powder increases to expand the field of hydrogen eliminating reaction and reduce the reaction resistance as the average particle size of the alloy powder is reduced, the reaction of corroding the hydrogen absorbing alloy is accelerated to reduce the cycle life when the average particle size becomes too small.

Although not very clear, it may be safe to assume that, when the average particle size is 50 μm, the reaction resistance falls because the surface area is reduced and additionally the catalyst layer becomes thick because of the large average particle size of the hydrogen absorbing alloy if the saturation mass susceptibility of the magnetic material remains same. Then, the distance separating the alloy parent phase and the magnetic material that is to exert a catalytic effect is increased so that the catalytic effect is not effectively exerted in reality to by turn reduce the effect of lowering the reaction resistance, although the alloy is expected to react.

It is preferable to use hydrogen absorbing alloy powder having an average particle size of not greater than 35 μm when an output density of not less than 500 W/kg is to be achieved. Additionally, it is preferable to use hydrogen absorbing alloy powder having an average particle size not greater than 28 μm when an output density not less than 600 W/kg is to be achieved.

Thus, from the above, the average particle size of hydrogen absorbing alloy powder is preferably between 10 and 35 μm, more preferably between 10 and 28 μm to produce a nickel metal-hydride battery showing both an excellent output power performance and an excellent cycle performance.

(Effect of Adding Er Oxide Powder or Yb Oxide Powder to Hydrogen Absorbing Electrode)

Example 16

1 weight portion of $Yb_2O_3$ powder showing an average particle size of 5 μm was added to 100 portions of hydrogen absorbing alloy powder that has been subjected to a surface reforming process instead of $Er_2O_3$ powder in the process of preparing a cell for testing a single electrode of a hydrogen absorbing electrode and a negative electrode of a cylindrical nickel metal-hydride battery of Example 1. Otherwise a cell for testing a single electrode was prepared and the reaction resistance thereof was tested in the above-described manner. A cylindrical nickel metal-hydride battery was prepared as in Example 1 except that $Yb_2O_3$ powder showing an average particle size of 5 μm was used instead of $Er_2O_3$ powder and subjected to a test as in Example 1. This example is referred to as Example 16.

Reference Example 3

No $Er_2O_3$ powder was added to hydrogen absorbing alloy powder that has been subjected to a surface reforming process in the process of preparing a cell for testing a single electrode of a hydrogen absorbing electrode and a negative electrode of a cylindrical nickel metal-hydride battery of Example 1. Otherwise a cell for testing a single electrode was prepared and the reaction resistance thereof was tested in the above-described manner. A cylindrical nickel metal-hydride battery was prepared as in Example 1 except that no $Er_2O_3$ powder was added to hydrogen absorbing alloy powder and subjected to a test as in Example 1. This example is referred to as Reference Example 3.

Table 7 below summarily shows the results of the tests on Example 16 and Reference Example 3 along with the results of the tests on Example 1 and the results of a single electrode test of a hydrogen absorbing alloy electrode prepared by using hydrogen absorbing alloy powder C same as in Example 1.

TABLE 7

| classification | hydrogen absorbing electrode | hydrogen absorbing electrode reaction resistance (mΩ) | battery characteristics output density (W/kg) | cycle life (cycles) |
|---|---|---|---|---|
| Example 1 | added by 1 weight portion of $Er_2O_3$ | 210 | 667 | 560 |
| Example 16 | added by 1 weight portion of $Yb_2O_3$ | 250 | 611 | 590 |
| Ref. Example 3 | not added | 210 | 658 | 300 |

As clearly seen from Table 7, the cycle life of battery is extremely short when no rare earth compound is added to the hydrogen absorbing alloy electrode. This is probably because the corrosion of the hydrogen absorbing alloy is inhibited by the added Er or Yb oxide and the degradation of the capacity of the negative electrode is decelerated. Thus, a battery showing an excellent cycle life performance can be obtained by adding Er or Yb oxide powder to the hydrogen absorbing alloy powder of the hydrogen absorbing alloy electrode.

By comparing different hydrogen absorbing alloy electrodes for the reaction performance and the output power performance of the battery as shown in Table 7, it was found that the reaction resistance rises and the output power performance falls when $Er_2O_3$ is added than when the oxide is not added. On the other hand, it was also found that the reaction resistance rises and the output power performance falls to a lesser extent when $Yb_2O_3$ is added than when the oxide is not added. However, the cycle performance is better if compared with the case where $Er_2O_3$ is added. Therefore, oxides and hydroxides of Er and Yb are effective for improving the reaction resistance and the output power performance but it is preferable to add Er when a high output density is to be stressed, whereas it is preferable to add Yb when a long cycle life is to be emphasized at the cost of output density to some extent.

Although not used in the above-described examples, the cycle performance of a hydrogen absorbing electrode containing hydrogen absorbing alloy powder as active material according to the present invention can be improved without reducing the output performance by adding one or more than one rare earth compounds that contain both Er and Yb (either a mixture of an Er compound and a Yb or a composite compound containing both Er and Yb) when the weight of the rare earth elements, or the sum of the weight Er and that of Yb, contained in the one or more than one rare earth compounds is not less than 90 wt % of the total weight of the one or more than one compounds.

(Influence of Profile of Current Collecting Lead and Number of Welded Points on Lower Current Collecting Plate and Inner Surface of Container)

Example 17

In example 1, a projection for welding is provided at the center of the lower current collecting plate and a welding point of the inner surface of the bottom of the container is formed in a central part the lower current collecting plate. A battery otherwise having a structure same as that of Example 1 was prepared and this example is referred to as Example 17.

Reference Example 4

Figure 5:
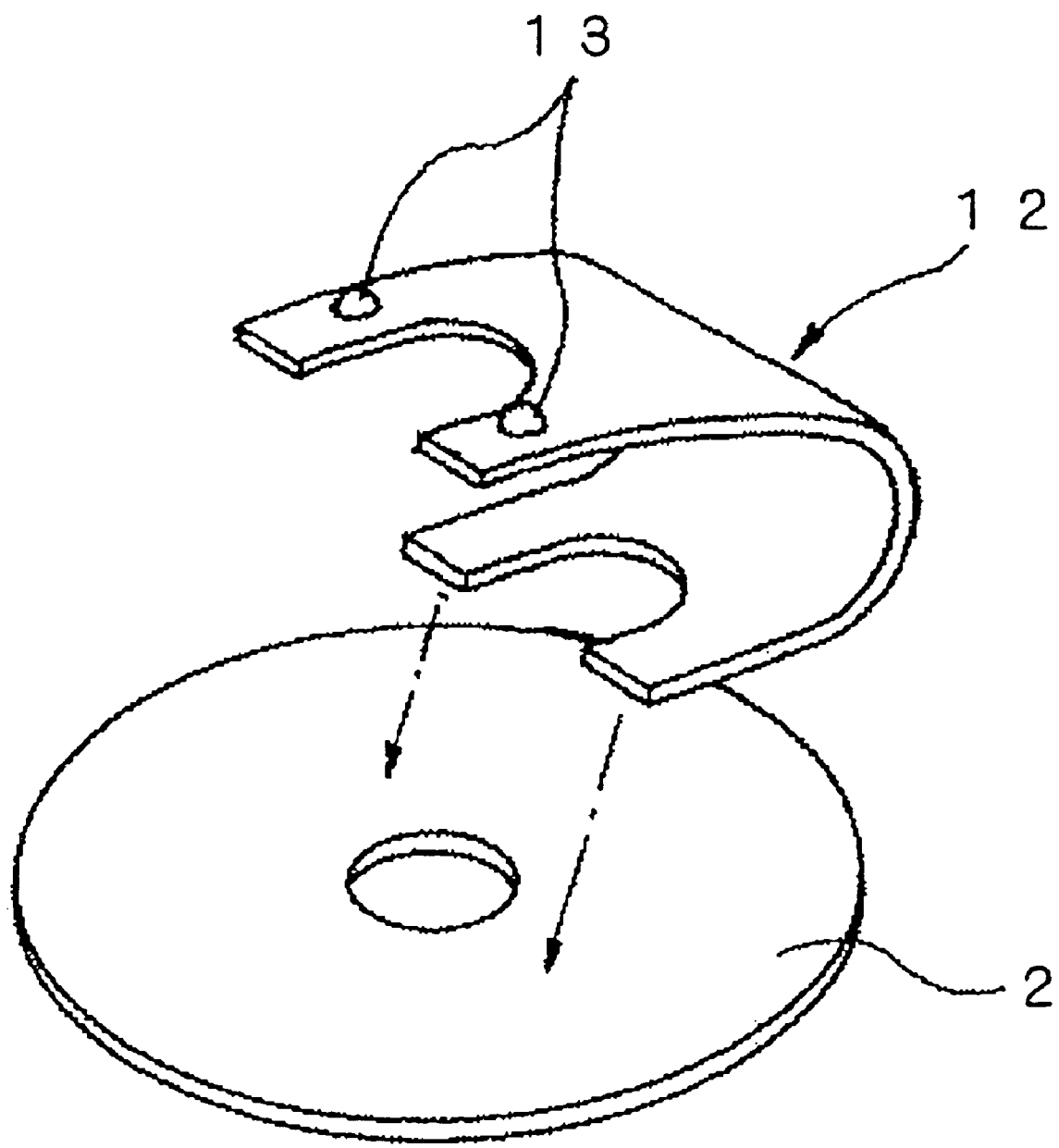
FIG. 5 is a schematic illustration of a ribbon-like current collecting lead.

In this example, the ring-shaped current collecting lead of Example 17 was replaced by a ribbon-like lead as shown in FIG. 5. The ribbon-like lead was made of a nickel plate having a thickness of 0.6 mm, width of 15 mm and a length of 25 mm. Before incorporating the lid into the battery (before sealing the battery), the ribbon-like lead and the inner surface of the sealing plate and the ribbon-like lead and the upper surface of the upper current collecting plate were bonded at four welded points respectively. The minimum length of the current collecting lead connecting the welded points of the current collecting lead and the sealing plate and the welded points of the current collecting lead and the upper current collecting plate was about seven times as long as the gap separating the sealing plate and the upper current collecting plate. This example is referred to as Reference Example 4.

The output densities of the specimen of Example 17 and that of the specimen of Reference Example 4 were observed as in Example 1. Table 8 below summarily shows the results of the measurements in Example 17 and Reference Example 4 along with the results of the measurement in Example 1.

TABLE 8

| classification | profile of collecting lead | welded point between lower current collecting plate and container | output density (W/kg) |
| --- | --- | --- | --- |
| Example 1 | ring-shaped main lead + supplementary lead | center of lower current collecting plate + 8 points | 667 |
| Example 17 | ring-shaped main lead + supplementary lead | only center of lower current collecting plate | 645 |
| Ref. Example 4 | ribbon-like lead | only center of lower current collecting plate | 575 |

As shown in Table 8, Example 1 and Example 17 showed a high output density if compared with Reference Example 4. The current collecting lead and the upper current collecting plate are welded after sealing a battery according to the present invention. Therefore, it is not necessary to provide the current collecting lead with a flexure margin and hence the electric resistance of the current collecting lead is minimized. On the other hand, the current collecting lead needs to be provided with a flexure margin when one of the opposite ends of the current collecting lead is bonded to the inner surface of the sealing plate while the other end is bonded to the upper current collecting plate in advance and subsequently the lid is fitted to the open end of the container according to the prior art assembly process as in the case of Reference Example 4. The output density of the battery of Reference Example 4 was low probably because the electric resistance of the current collecting lead was large for the above-described reason. It is advantageous for obtaining a high output to weld the lower current collecting plate and the inner surface of the container not only at the center of the lower current collecting plate as in the case of Example 17 but also at a plurality of welded points located off the center of the lower current collecting plate as in the case of Example 1. A nickel metal-hydride battery according to the present invention can provide an excellent output power performance by combining a hydrogen absorbing electrode according to the present invention and a collecting structure as described above in Example 1 or Example 17.

INDUSTRIAL APPLICABILITY

As described above in detail, a nickel metal-hydride battery according to the present invention comprises a hydrogen absorbing electrode formed by using hydrogen absorbing alloy powder as an active material and shows both an excellent output power performance and an excellent cycle performance. Therefore a nickel metal-hydride battery according to the present invention has a high industrial applicability.

The invention claimed is:

1. A nickel metal-hydride battery comprising: a nickel electrode and a hydrogen absorbing electrode respectively as positive electrode and negative electrode, wherein the hydrogen absorbing electrode is formed by making a conductive support carry hydrogen absorbing alloy particle of a rare earth element and a non-rare earth element including nickel and a saturation mass susceptibility of said hydrogen absorbing alloy particle is 2 to 6 emu/g, and a rate at which said hydrogen absorbing electrode carries hydrogen absorbing alloy particle per unit area is 0.06 to 0.15 $g/cm^2$.

2. The nickel metal-hydride battery according to claim 1, wherein an average particle size of said hydrogen absorbing alloy powder is 10 to 35 μm.

3. The nickel metal-hydride battery according to claim 1, wherein said hydrogen absorbing electrode contains a hydroxide of at least a rare earth element that is either erbium (Er) or ytterbium (Yb).

4. The nickel metal-hydride battery according to claim 2, wherein said hydrogen absorbing electrode contains a hydroxide of at least a rare earth element that is either erbium (Er) or ytterbium (Yb).

5. The nickel metal-hydride battery according to claim 1, wherein the nickel metal-hydride battery is a sealed nickel metal-hydride battery having a rolled electrode assembly and a cylindrical container with a bottom sealed by a lid at the open end, the inner surface of a sealing plate of the lid and the top surface of the upper current collecting plate fitted to the upper rolled end of the electrode assembly being connected by way of a current collecting lead and that at least either the welded point of the inner surface of said sealing plate and the current collecting lead or the welded point of the current collecting lead and the upper current collecting plate is welded by energizing between the positive electrode terminal and the negative electrode terminal by means of an external power source by way of the inside of the battery after the sealing.

6. The nickel metal-hydride battery according to claim 1, wherein the saturation mass susceptibility of said hydrogen absorbing alloy particle is 4 to 6 emu/g.

7. The nickel metal-hydride battery according to claim 1, wherein the rate at which said hydrogen absorbing electrode carries said hydrogen absorbing alloy particle per unit area is 0.07 to 0.15 $g/cm^2$.

8. The nickel metal-hydride battery according to claim 1, wherein the rate at which said hydrogen absorbing electrode carries said hydrogen absorbing alloy particle per unit area is 0.09 to 0.15 $g/cm^2$.

9. The nickel metal-hydride battery according to claim 1, wherein said hydrogen absorbing alloy particle has AB5 type crystal structure.

10. The nickel metal-hydride battery according to claim 3, wherein a ratio of addition of said hydroxide of at least said rare earth element that is either erbium (Er) or ytterbium (Yb) is 0.3 to 1.5 weight portions relative to 100 weight portions of said hydrogen absorbing alloy particle.

11. The nickel metal-hydride battery according to claim 1, wherein the nickel metal-hydride battery is a sealed nickel metal-hydride battery having a rolled electrode assembly and a cylindrical container with a bottom sealed by a lid at the open end, the inner surface of a sealing plate of said lid and the top surface of an upper current collecting plate fitted to an upper rolled end of said electrode assembly being connected by way of a current collecting lead and that a ratio of the length of said current collecting lead between the welded point of said current collecting lead and said sealing plate and the welded point of said current collecting lead and said upper current collecting plate to the gap between said sealing plate and said upper current collecting plate is equal to or less than 2.1.

12. The nickel metal-hydride battery according to claim 1, wherein the nickel metal-hydride battery is a sealed nickel metal-hydride battery having a rolled electrode assembly and a cylindrical container with a bottom sealed by a lid at the open end, the inner surface of a sealing plate of said lid and the top surface of an upper current collecting plate fitted to an upper rolled end of said electrode assembly being connected by way of a current collecting lead and that a ratio of the length of said current collecting lead between the welded point of said current collecting lead and said sealing plate and the welded point of said current collecting lead and said upper current collecting plate to the gap between said sealing plate and said upper current collecting plate is equal to or less than 1.7.

13. A method for preparing a hydrogen absorbing electrode comprising the steps of:

immersing a hydrogen absorbing alloy particle of a rare earth element and a non-rare earth element including nickel in an aqueous alkaline solution so that a saturation mass susceptibility is 2 to 6 emu/g of said hydrogen absorbing alloy particle, applying said hydrogen absorbing alloy particle to a conductive support so that a rate of filling said hydrogen absorbing alloy particle is 0.06 to 0.15 g/cm$^2$.

14. The method of claim 13, wherein said aqueous alkaline solution is an aqueous sodium hydroxide solution.

15. The method of claim 13, wherein said aqueous alkaline solution is an aqueous sodium hydroxide solution of 28 to 50 wt % at 90 to 110° C.

* * * * *